United States Patent
Orr et al.

(10) Patent No.: US 10,922,941 B2
(45) Date of Patent: Feb. 16, 2021

(54) SYSTEM AND METHOD FOR DETECTING SMOKE USING A PHOTOELECTRIC SENSOR

(71) Applicant: 4Morr Enterprises IP, LLC, Katy, TX (US)

(72) Inventors: Michael Orr, Katy, TX (US); Eric Overton, Austin, TX (US)

(73) Assignee: 4Morr Enterprises IP, LLC, Katy, TX (US)

(*) Notice: Subject to any disclaimer, the term of this patent is extended or adjusted under 35 U.S.C. 154(b) by 0 days.

(21) Appl. No.: 16/130,936

(22) Filed: Sep. 13, 2018

(65) Prior Publication Data

US 2019/0228627 A1 Jul. 25, 2019

Related U.S. Application Data

(60) Provisional application No. 62/557,779, filed on Sep. 13, 2017.

(51) Int. Cl.
*G08B 17/107* (2006.01)
*H04L 12/28* (2006.01)
(Continued)

(52) U.S. Cl.
CPC ............ *G08B 17/107* (2013.01); *G01V 8/20* (2013.01); *G08B 3/10* (2013.01); *G08B 17/10* (2013.01);
(Continued)

(58) Field of Classification Search
CPC ........ G08B 17/107; G08B 3/10; G08B 17/10; G08B 17/113; G08B 17/125;
(Continued)

(56) References Cited

U.S. PATENT DOCUMENTS

2007/0188427 A1* 8/2007 Lys .................... H05B 33/0815
345/82
2014/0197957 A1* 7/2014 Fischer ................ G08B 17/107
340/630
(Continued)

OTHER PUBLICATIONS

Laramyk—The Electromagnetic Spectrum—May 5, 2010 https://web.archive.org/web/20100814115100/http://www.laramyk.com/resources/education/lens-form-and-theory/the-electromagnetic-spectrum/ (Year: 2010).*

*Primary Examiner* — Omer S Khan
(74) *Attorney, Agent, or Firm* — Spradley PLLC; Michael Spradley

(57) ABSTRACT

A system and method for detecting smoke using a photoelectric sensor is disclosed herein. The smoke detector can comprise a photoelectric smoke detection system, a smoke detector memory, and a microprocessor. The photoelectric smoke detection system can comprise a low-frequency light source, a high-frequency light source, and a light sensor. The smoke detector memory can comprise a smoke detector application, a plurality of low-frequency smoke signatures, and a plurality of high-frequency smoke signatures. Each of the low-frequency smoke signatures can relate to how a low-frequency light interacts with one of a plurality of particulates. Each of the high-frequency smoke signatures can relate to how a high-frequency light interacts with one of the plurality of particulates. Each of the particulates can be indicative or non-indicative of a fire.

26 Claims, 21 Drawing Sheets

(51) Int. Cl.
    *G08B 25/00*   (2006.01)
    *G08B 17/12*   (2006.01)
    *H04L 29/08*   (2006.01)
    *G08B 3/10*    (2006.01)
    *G08B 17/10*   (2006.01)
    *G08B 25/10*   (2006.01)
    *G08B 17/113*  (2006.01)
    *G08B 25/08*   (2006.01)
    *G08C 17/02*   (2006.01)
    *G01V 8/20*    (2006.01)

(52) U.S. Cl.
    CPC .......... *G08B 17/113* (2013.01); *G08B 17/125* (2013.01); *G08B 25/001* (2013.01); *G08B 25/006* (2013.01); *G08B 25/009* (2013.01); *G08B 25/08* (2013.01); *G08B 25/10* (2013.01); *G08C 17/02* (2013.01); *H04L 12/2827* (2013.01); *H04L 67/12* (2013.01)

(58) Field of Classification Search
    CPC .. G08B 25/001; G08B 25/006; G08B 25/009; G08B 25/08; G08B 25/10; G01V 8/20; H04L 12/2827; H04L 67/12; G08C 17/02
    See application file for complete search history.

(56) References Cited

U.S. PATENT DOCUMENTS

| | | | |
|---|---|---|---|
| 2016/0163184 A1* | 6/2016 | Thompson | G08B 21/10 340/539.22 |
| 2017/0053508 A1* | 2/2017 | Urrutia | G08B 17/10 |
| 2017/0353248 A1* | 12/2017 | Booman | H04B 10/532 |

\* cited by examiner operate a smoke detector (200) as a node in a mesh network of a local area network (104), said smoke detector can be capable of receiving network data and sending said network data across said local area network (104);

receive, while operating as said node, smoke alarm data and other data within said network data, from a second smoke detector (200b), said second smoke detector (200b) having transmitted said smoke alarm data over said mesh network;

halting sending other data upon receiving said smoke alarm data;

sending said smoke alarm data; and resuming sending said other network data only after said smoke alarm data is completely sent.

Fig. 7B

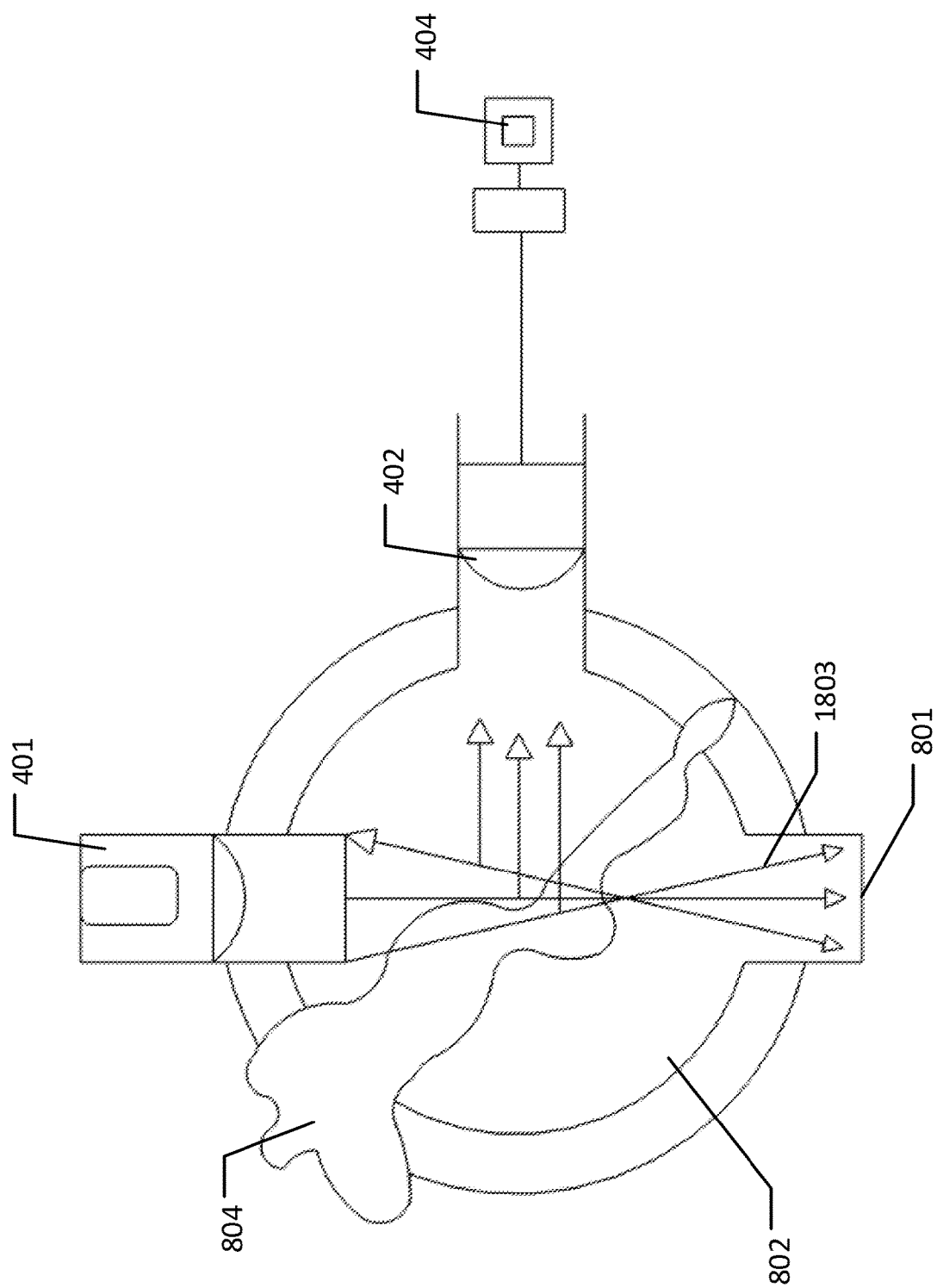

SYSTEM AND METHOD FOR DETECTING SMOKE USING A PHOTOELECTRIC SENSOR

BACKGROUND

This disclosure relates to a system and method for effecting smoke detector data transmission from a smoke detector. This disclosure further relates to an improved system for effecting smoke detector data using an emergency personnel router. This disclosure further relates to a system and method for detecting smoke using a photoelectric sensor. This disclosure further relates to an improved system and method for reducing false-positives by a smoke detector, using a photoelectric sensor and an ionization sensor. This disclosure further relates to an improved smoke detection enclosure for recessed installment. For purposes of this disclosure, many embodiments are discussed, and are an example of the above-mentioned systems and methods. However, such discussions are solely exemplary and not limiting.

Smoke detectors have been in homes for many years. Recently, as home devices have become smart, so too have smoke detectors. Today homes have traditional smoke detectors using ionization detectors, and smart systems also using ionization detectors and connecting to home routers. However, problems still exist both with traditional and smart smoke detectors have particular problems.

First, for a smart detector to send warning of a fire beyond its audible range, it requires a network connection, typically through a wireless router. However, if the smoke detector is far from the router, it may not be able to connect. Some smart devices have a wired connection. However, wired connections often times can be destroyed before the smoke detector detects the fire if the fire begins in the walls or a room away from the smoke detector.

Second, information in a network passes through the router (and modem) to the Internet. If a fire destroys the router and/or modem if separate, a smart smoke alarm will be orphaned with no way to get potentially vital information out.

Third, smoke detectors using ionization technology have unique problems. They are poor at determining innocuous smoke such as smoke cooking a hamburger on the stove, from a sofa cushion on fire. Also, they are not particularly sensitive, needing a lot of smoke to break the ionization path. Environmentally, there are significant problems with smoke detectors using ionization sensors. First, each has low level radioactive waste with a four-hundred-year half-life, causing disposal problem. Further, it can't be made in the United States. Presently, most or all ionization sensors for smoke detectors come from China. Further, smoke detectors making use of ionization sensors only use a threshold in determining whether an alarm should sound, not making user of other important temporal information.

As such it would be useful to have an improved system and method for effecting smoke detector data transmission from a smoke detector by the smoke detector. Additionally, it would be advantageous to have an improved system for effecting smoke detector data using an emergency personnel router. It would further be advantageous to have an improved system and method for reducing false-positives by a smoke detector using a photoelectric sensor and an ionization sensor. Lastly, it would be advantageous to have an improved smoke detection enclosure for recessed installment.

SUMMARY

A system and method for effecting smoke detector data transmission from a smoke detector is described herein. The smoke detector can comprise a smoke detection system, a smoke detector memory, and a microprocessor. The smoke detector memory can comprise a smoke detector application. The microprocessor can, according to instructions from the smoke detector application operate as a node in a mesh network of a local area network by receiving network data and sending the network data across the local area network. Moreover, according to the instructions from the smoke detector application, the microprocessor can receive smoke alarm data from the smoke detection system, and interrupt sending the network data across the local area network. Additionally, according to the instructions from the smoke detector application, the microprocessor can send the smoke alarm data and resume sending the network data to the other nodes in the mesh network only after the smoke alarm data is completely sent.

In another embodiment, the smoke detector can comprise a smoke detection system, a smoke detector memory, and a microprocessor. The smoke detector memory can comprise a smoke detector application. The microprocessor can, according to instructions from the smoke detector application operate as a node in a mesh network of a local area network by receiving network data and sending the network data across the local area network. Moreover, according to the instructions from the smoke detector application, the microprocessor can receive, while operating as the node, smoke alarm data from a second smoke detector, and other data within the network data. The second smoke detector having transmitted the smoke alarm data over the mesh network. Additionally, according to the instructions from the smoke detector application, the microprocessor can halt sending other data upon receiving the smoke alarm data, can send the smoke alarm data, and can resume sending the other network data only after the smoke alarm data is completely sent.

In another embodiment, a method for effecting smoke detector data transmission from a smoke detector is described herein. The method of transmitting smoke detector data can comprise the steps of operating the smoke detector as a node in a mesh network of a local area network. The smoke detector can receive network data and send the network data across the local area network. The method can also comprise the steps of receiving the smoke alarm data from a smoke detection system within the smoke detector, interrupting sending the network data across the local area network, sending the smoke alarm data, and resuming sending the network data to the other nodes in the mesh network only after the smoke alarm data is completely sent.

In another embodiment, a method for effecting smoke detector data transmission from a smoke detector is described herein. The method of transmitting smoke detector data can comprise the steps of operating the smoke detector as a node in a mesh network of a local area network. The smoke detector can receive network data and send the network data across the local area network. The method can also comprise the steps of receiving, while operating as the node, smoke alarm data from a second smoke detector, and other data within the network data. The second smoke detector having transmitted the smoke alarm data over the mesh network. The method can also comprise the steps of halting sending other data upon receiving the smoke alarm data, sending the smoke alarm data, and resuming sending the other network data only after the smoke alarm data is completely sent.

In another embodiment an improved system for effecting smoke detector data using an emergency personnel router is disclosed herein. A smoke detector can comprise a smoke detection system, a smoke detection memory, and a microprocessor. The smoke detector memory can comprise a smoke detector application, and a connection protocol for an emergency personnel router. The microprocessor can, according to instructions from the smoke detector application receive smoke alarm data, and detect a wireless emergency personnel router. Moreover the microprocessor can, according to instructions from the smoke detector application connect to the wireless emergency personnel router using the connection protocol, and send the smoke alarm data via the emergency personnel router.

In another embodiment a method for effecting smoke detector data using an emergency personnel router is disclosed herein. The method of transmitting a smoke detector can comprise the steps of receiving smoke alarm data by the smoke detector, detecting a wireless emergency personnel router, and connecting the smoke detector to the wireless emergency personnel router using a connection protocol stored in a memory of the smoke detector. Lastly, the method can comprise the step of sending the smoke alarm data from the smoked detector to the emergency personnel router.

In another embodiment a system and method for detecting smoke using a photoelectric sensor is disclosed herein. The smoke detector can comprise a photoelectric smoke detection system, a smoke detector memory, and a microprocessor. The photoelectric smoke detection system can comprise a low-frequency light source, a high-frequency light source, and a light sensor. The smoke detector memory can comprise a smoke detector application, a plurality of low-frequency smoke signatures, and a plurality of high-frequency smoke signatures. Each of the low-frequency smoke signatures can relate to how a low-frequency light interacts with one of a plurality of particulates. Each of the high-frequency smoke signatures can relate to how a high-frequency light interacts with one of the plurality of particulates. Each of the particulates can be indicative or non-indicative of a fire. The microprocessor can, according to instructions from the smoke detector application receive light data from the light sensor, and extract low-frequency light data and high-frequency light data from the light data. Moreover the microprocessor can according to instructions from the smoke detector application compare the low-frequency light data the plurality of low-frequency smoke signatures to determine if the low-frequency light data matches any of the plurality of low-frequency smoke signatures, and comparing the high-frequency light data the plurality of high-frequency smoke signatures to determine if the high-frequency light data matches any of the plurality of high-frequency smoke signatures. Furthermore, the microprocessor can, according to instructions from the smoke detector application initiate an alarm sequence if the low-frequency light data matches a low-frequency smoke signature related to a fire-indicative particulate of the plurality of particulates. Additionally, the microprocessor can, according to instructions from the smoke detector application initiate an alarm sequence if the high-frequency light data matches a high-frequency smoke signature related to the fire-indicative particulate.

In another embodiment a method for detecting smoke using a photoelectric sensor is disclosed herein. The method can comprise the step of storing in memory a plurality of low-frequency smoke signatures, and a plurality of high-frequency smoke signatures. Each of the low-frequency smoke signatures can relate to how a low-frequency light interacts with one of a plurality of particulates. Each of the high-frequency smoke signatures can relate to how a high-frequency light interacts with one of the plurality of particulates. Each of the particulates can be indicative or non-indicative of a fire. The method can also comprise the steps of receiving light data from a light sensor, extracting low-frequency light data and high-frequency light data from the light data, and comparing the low-frequency light data the plurality of low-frequency smoke signatures to determine if the low-frequency light data matches any of the plurality of low-frequency smoke signatures. Moreover, the method can comprise the step of comparing the high-frequency light data the plurality of high-frequency smoke signatures to determine if the high-frequency light data matches any of the plurality of high-frequency smoke signatures. Additionally, the method can comprise the step of initiating an alarm sequence if the low-frequency light data matches a low-frequency smoke signature related to a fire-indicative particulate of the plurality of particulates, and initiating an alarm sequence if the high-frequency light data matches a high-frequency smoke signature related to the fire-indicative particulate.

In another embodiment an improved system and method for detecting smoke using an ionization sensor is disclosed herein. A smoke detector can comprise the ionization sensor, a smoke detector memory, and a microprocessor. The ionization sensor can comprise an ionization chamber. The smoke detector memory can comprise a smoke detector application, and a plurality of ionization smoke signatures. The plurality of ionization smoke signatures, wherein each of the ionization smoke signatures relates to how the ionization chamber interacts with one of a plurality of particulates. Each of the plurality of particulates can be indicative or non-indicative of a fire. The microprocessor can, according to instructions from the smoke detector application receive current data from the ionization sensor, and compare the current data with the plurality of ionization smoke signatures to determine if the current data matches any of the plurality of ionization smoke signatures. Moreover the microprocessor can, according to instructions from the smoke detector application initiate an alarm sequence based at least in part on a determination as to whether the current data matches an ionization smoke signature related to a fire-indicative particulate of the plurality of particulates.

In another embodiment, an improved method for detecting smoke using an ionization sensor is disclosed herein. The method can comprise the steps of storing in memory a plurality of ionization smoke signatures, wherein each of the ionization smoke signatures relates to how an ionization chamber interacts with one of a plurality of particulates, each of the plurality of particulates indicative or non-indicative of a fire, and receiving current data from the ionization sensor. Moreover the method can comprise the steps of comparing the current data with the plurality of ionization smoke signatures to determine if the current data matches any of the plurality of ionization smoke signatures, and initiating an alarm sequence based at least in part on a determination as to whether the current data matches an ionization smoke signature related to a fire-indicative particulate of the plurality of particulates.

In another embodiment an improved smoke detection enclosure for recessed installment is disclosed herein. A smoke detector for recessed installment can comprise a housing, a printed circuit board (PCB), a bottom cover, and a plurality of clips. The housing can be capable of being installed within a surface. The printed circuit board (PCB) can comprise one or more smoke detection systems. The PCB can be mounted within the housing such that upon installation into a surface, the PCB is approximately at the surface. The bottom cover can extend beyond edges of the housing to form a surface lip. The surface lip can be capable of interacting with a first side of the surface. The bottom cover can comprise one or more air vents, each of the one or more air vents can be placed directly underneath of each of the one or more smoke detection systems. The plurality of clips, each of the pair of clips at the opposite side of the housing. The clips capable of interacting with a second side of the surface such that together with the surface lip, the plurality of clips can mount the housing within the surface.

BRIEF DESCRIPTION OF THE DRAWINGS

FIG. 7B illustrates another exemplary method of transmitting smoke alarm data received from a second smoke detector.

FIG. 8A illustrates photoelectric sensor comprising a single light source.

DETAILED DESCRIPTION

Described herein is a system and method for . . . . The following description is presented to enable any person skilled in the art to make and use the invention as claimed and is provided in the context of the particular examples discussed below, variations of which will be readily apparent to those skilled in the art. In the interest of clarity, not all features of an actual implementation are described in this specification. It will be appreciated that in the development of any such actual implementation (as in any development project), design decisions must be made to achieve the designers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the field of the appropriate art having the benefit of this disclosure. Accordingly, the claims appended hereto are not intended to be limited by the disclosed embodiments, but are to be accorded their widest scope consistent with the principles and features disclosed herein.

Figure 1:
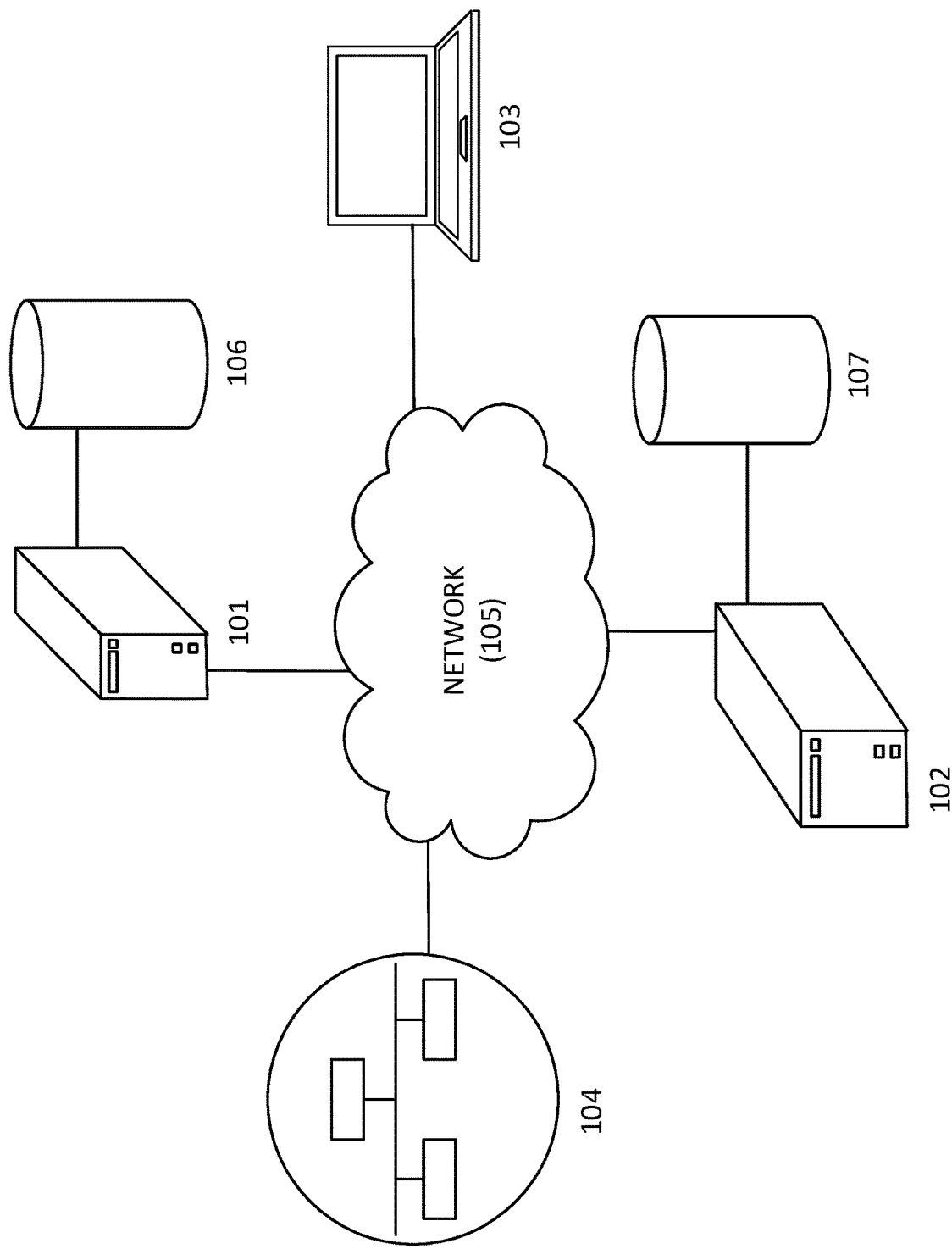
FIG. 1 illustrates a wide-area network (WAN) comprising a server, a mobile device, and a local area network, the local area network comprising smart devices connected by WIFI.

FIG. 1 illustrates a home monitoring server 101, one or more emergency response servers 102, one or more mobile devices 103, and a local area network (LAN) 104 in communication over network 105. Home monitoring server 101 and emergency response servers 102 can each represent at least one, but can be many servers, each connected to network 105 capable of performing computational task, and storing data information. Home monitoring server 101 can be connected to one or more home monitoring databases 106.

Emergency response servers 102 can be connected to one or more emergency response databases 107. Emergency response databases can store files, and record information from different authoritative databases that can include but is not limited to fire department, police department, 9-1-1, emergency dispatch department, etc. Mobile devices 103 can be desktop computers, laptops, tablets, or smartphones capable of receiving, storing and sending out data information through WAN 105.

LAN 104 can be a computer network that links electronic devices such as computers, mobile devices 103, or other smart devices within a small defined area such as a building or set of buildings. Network 105 can be a local area network (LAN), a wide area network (WAN), a piconet, or a combination of LANs, WANs, or piconets. One illustrative WAN is the Internet. In a preferred embodiment, network 105 can comprise the Internet. In one embodiment, WAN 105 can be WIFI.

Figure 2:
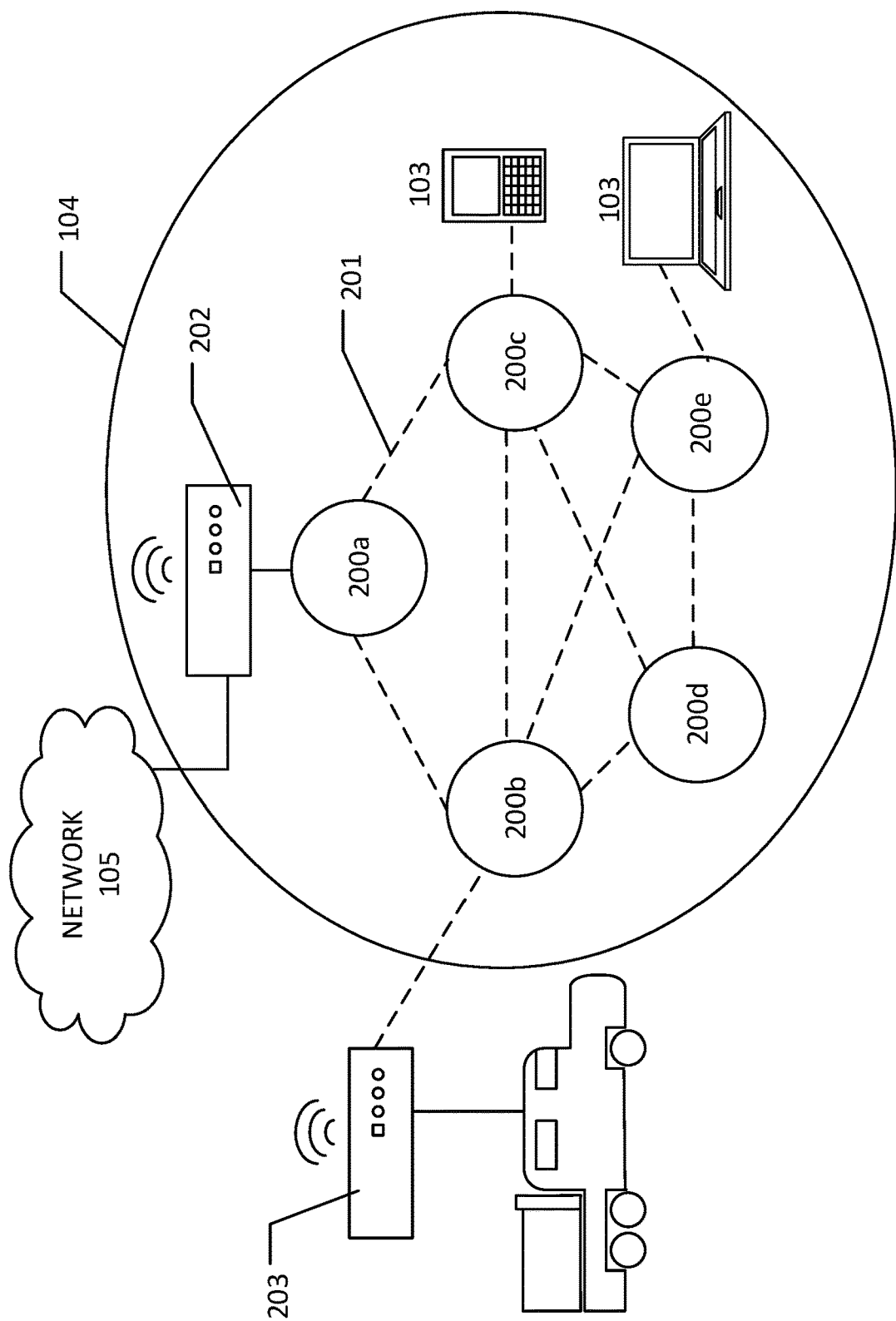
FIG. 2 illustrates a local-area network (LAN) comprising smart devices connected to the LAN via WIFI using a meshed network connection method.

FIG. 2 illustrates a local-area network (LAN) 104 comprising a plurality of smoke detectors 200 connected to LAN 104 via WIFI connection 201 using a meshed network connection method. Within the context of this disclosure, smoke detectors 200 can be smart devices and are capable of communicating with each other through LAN 104. In such embodiment, smoke detectors 200 can do edge computing through software defined local area network (SD-LAN). For purposes of this disclosure, meshed network connection method is a local network topology that can allow a plurality of wireless mesh nodes to communicate to each other to share the network connection across a particular area. In this embodiment, each smoke detector 200 can function as wireless mesh nodes. As such, each smoke detector 200 can comprise radio transmitters capable of communicating with other smoke detectors 200 through WIFI connection 201. In such embodiment, smoke detectors 200 can provide mesh network in an entire house or vicinity. As such, smoke detectors 200 can provide WIFI connection 201 to mobile devices 103 to the entire vicinity.

In this embodiment, LAN 104 can connect directly to network 105. LAN 104 typically comprises a router 202. Router 202 can comprise a modem, and can link network 105 with LAN 104. In one embodiment, at least one of smoke detectors 200 near the router can connect to LAN 104, while other smoke detectors 200 can be connected wirelessly to the nearest smoke detector 200. In such embodiment, each smoke detector 200 can be a part of single wireless network and can share the same SSID and password. Unlike range extenders, which communicate with the router via the 2.4 GHz or 5 GHz radio bands, most Wi-Fi system satellites use mesh technology to talk to the router and to each other. Each smoke detector 200 can serve as a hop point for other nodes, such as other smoke detectors 200, in the system. This can help smoke detectors 200 farthest from router 202 maintain communication, not relying on one-on-one communication with router 202, while also extending WIFI connection 201 coverage. As such, the more nodes, the further the connection can be provided. This creates a wireless "cloud of connectivity" which can serve large vicinities. In one embodiment, smoke detectors 200 can connect with a wireless emergency personnel router 203, as discussed further below. In one embodiment, wireless emergency personnel router can be mounted to a vehicle such as a fire truck, police car, or ambulance.

Figure 3:
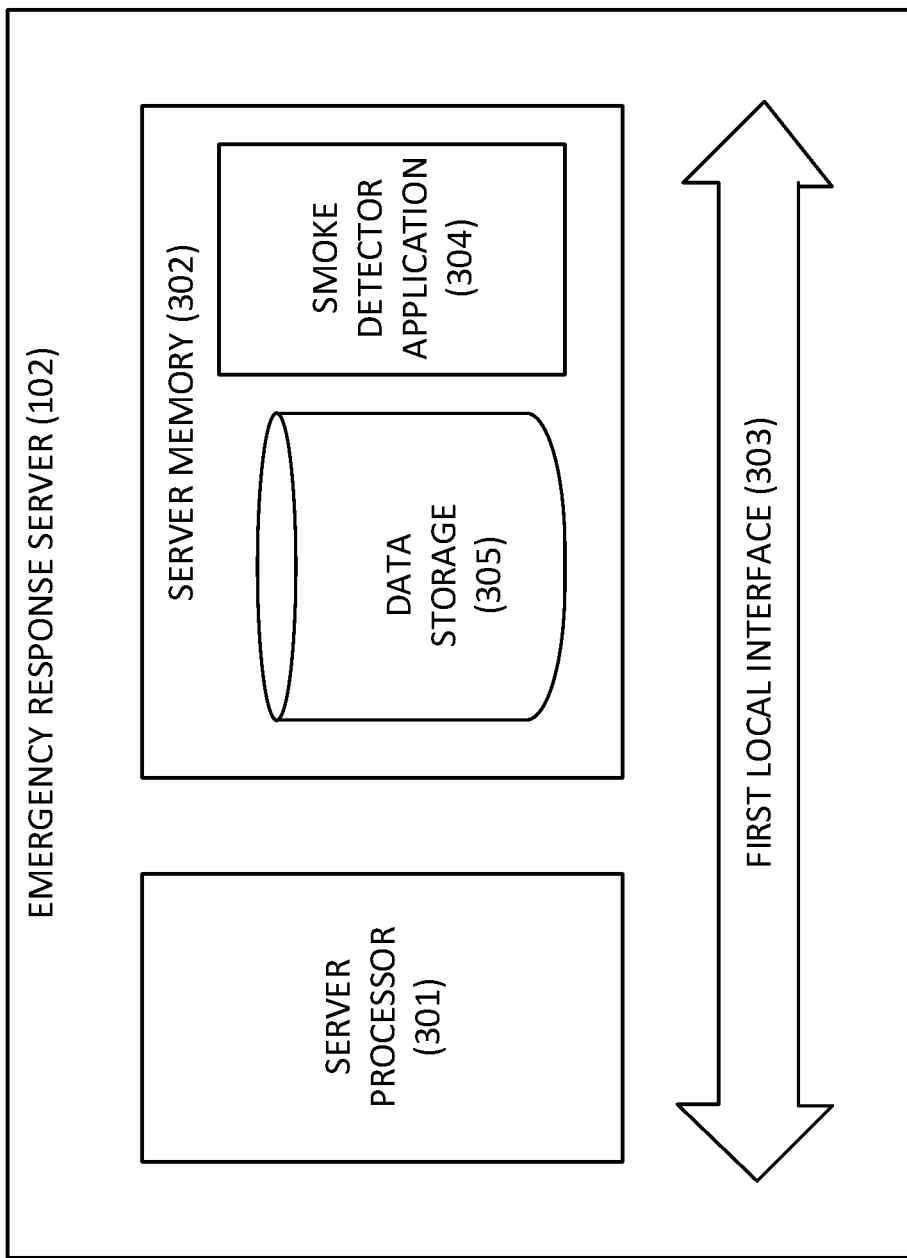
FIG. 3 illustrates a schematic diagram of an emergency response server.

FIG. 3 illustrates a schematic diagram of emergency response server 102 according to an embodiment of the present disclosure. Emergency response server 102 can comprise a server processor 301, and a server memory 302 and a first local interface 303. Local interface 303 can be a program that controls a display for the user, which can allow user to view and/or interact with server 102. Server processor 301 can be a processing unit that performs a set of instructions stored within server memory 302. Server memory 302 can comprise a smoke detector application 304, and a data store 305. In one embodiment, smoke detector application 304 can be a home monitoring service that can provide protection to the homeowners and their home. Smoke detector application 304 can comprise business logic for server 102. In this embodiment, smoke detector application 304 can contain HTML (Hyper Text Markup Language), PHP, scripts, and/or applications. Data store 305 can be collections of data accessible through smoke detector application 304. Further, smoke detector application 304 can perform functions such as adding, transferring and retrieving information on data store 305 using local interface 303.

Emergency response server 102 includes at least one processor circuit, for example, having server processor 301 and server memory 302, both of which are coupled to local interface 303. To this end, emergency response server 102 can comprise, for example, at least one server, computer or like device. Local interface 303 can comprise, for example, a data bus with an accompanying address/control bus or other bus structure as can be appreciated.

In particular, stored in the server memory 302 and executable by server processor 301 are smoke detector application 304, and potentially other applications. Also stored in server memory 302 can be server data store 305 and other data. In addition, an operating system can be stored in server memory 302 and executable by server processor 301.

It is understood that there can be other applications that are stored in server memory 302 and are executable by server processor 301 as can be appreciated. Where any component discussed herein is implemented in the form of software, any one of a number of programming languages can be employed such as, for example, C, C++, C#, Objective C, Java, Java Script, Perl, PHP, Visual Basic, Python, Ruby, Delphi, Flash, or other programming languages.

A number of software components can be stored in server memory 302 and can be executable by server processor 301. In this respect, the term "executable" means a program file that is in a form that can ultimately be run by server processor 301. Examples of executable programs can be, for example, a compiled program that can be translated into machine code in a format that can be loaded into a random access portion of server memory 302 and run by server processor 301, source code that can be expressed in proper format such as object code that is capable of being loaded into a random access portion of server memory 302 and executed by server processor 301, or source code that can be interpreted by another executable program to generate instructions in a random access portion of server memory 302 to be executed by server processor 301, etc. An executable program can be stored in any portion or component of server memory 302 including, for example, random access memory (RAM), read-only memory (ROM), hard drive, solid-state drive, USB flash drive, memory card, optical disc such as compact disc (CD) or digital versatile disc (DVD), magnetic tape, network attached/addressable storage or other memory components.

Figure 4:
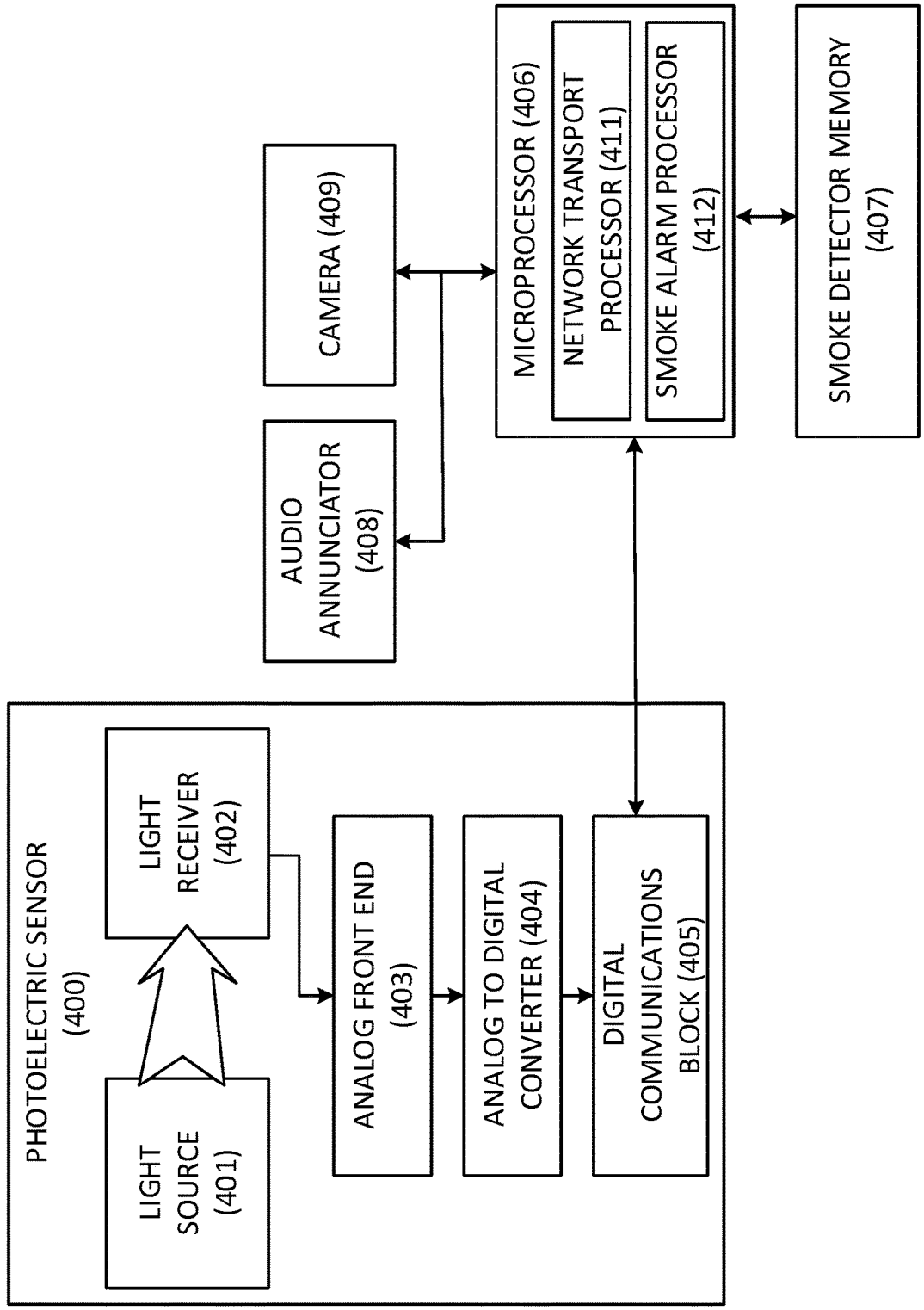
FIG. 4 illustrates a hardware configuration of a smoke detector with a photoelectric sensor for detecting smoke.

FIG. 4 illustrates a hardware configuration of smoke detector 200 with a photoelectric sensor 400 for detecting smoke. In one embodiment, smoke detector 200 can use a smoke detection system such as a photoelectric smoke detector to detect smoke. In this embodiment, smoke detector 200 can comprise a casing that houses photoelectric sensor 400. In a preferred embodiment, casing can be hermetically sealed. In such embodiment, smoke detector 200 can comprise a light source 401, a light receiver 402, a first analog front-end amplifier 403, an analog to digital converter (ADC) 404, and a digital communications block 405. For purposes of this disclosure, smoke detector 200 with photoelectric sensor 400 can use a beam of light to detect presence of smoke within a vicinity. As such, a T-shaped chamber with a light-emitting diode can produce a light beam that can travel unblocked from one end to the other end of a chamber. Photodiode 401 can be mounted within the chamber in such a way that the light beam does not hit photodiode 401. In one embodiment, photodiode 401 can be placed slightly away from the light beam. Thus, when smoke is present in the vicinity and enters the chamber of photoelectric sensor 400, the smoke particles that enters the chamber can disrupt the straight light causing the straight light to scatter. Some of the scattered light can then hit photodiode 401. Photodiode 401 can convert the light that hit the photodiode into an electrical signal and send it to first analog front end amplifier 403. First analog front-end amplifier 403 can be a set of analog signal conditioning circuitry that uses sensitive analog amplifiers for sensors to provide the best signal to ADC 404, or to a microcontroller. The electrical signal from photodiode 401 can then be amplified and/or conditioned by first analog front-end amplifier 403 and then be sent to ADC 404. ADC 404 can then take the analog signal from first analog front-end amplifier 403 and digitize the signal into a binary format readable by digital communications block 405. In this embodiment, photoelectric sensor 401 can be capable of performing digitization internally.

Further in one embodiment, smoke detector 200 can further comprise a microprocessor 406, a smoke detector memory 407, an audio speaker 408, and a camera 409. In such embodiment, after the signal from ADC 404 is digitized, digital communications block 405 can then allow the digital transmission of digital signal from ADC 404 to microprocessor 406. In one embodiment, microprocessor 405 can be two processors. In such embodiment microprocessor 406 can comprise a network transport processor 411 and a smoke alarm processor 412. Network transport processor 411 can handle network processes while smoke alarm processor 412 can handle on-board processes. Further, microprocessor 406 can receive the signal and can perform set of instructions according to the algorithms, and parameters within smoke detector memory 407. Thus in an embodiment wherein smoke can be detected by smoke detector 200, microprocessor 406 can send a signal to audio speaker 408 to initiate a smoke alarm sequence. In one embodiment, once the smoke alarm sequence is initiated microprocessor 406 can send a signal to trigger audio speaker 408 or other noise device sound the alarm. In another embodiment, microprocessor 406 can send signal to camera 408. As such, camera 408 can start gathering data images of the area and sends the data image to microprocessor 406. Then data images can be stored in smoke detector memory 407. Further in another embodiment, at a first detection of smoke on one of smoke detectors 200, mobile devices 103 can be notified. Furthermore, microprocessor 406 can send instructions to other smoke detectors 200 through network transport processor 411.

For purposes of this disclosure, initiating an alarm sequence can comprise of sounding an audible alarm through audio speaker 408, in one embodiment. In another embodiment, alarm sequence can comprise turning camera 409 on. In such embodiment, camera 409 can begin capturing images and/or videos. Further in another embodiment, alarm sequence can comprise of sending data over network 105 to a server.

Figure 5:
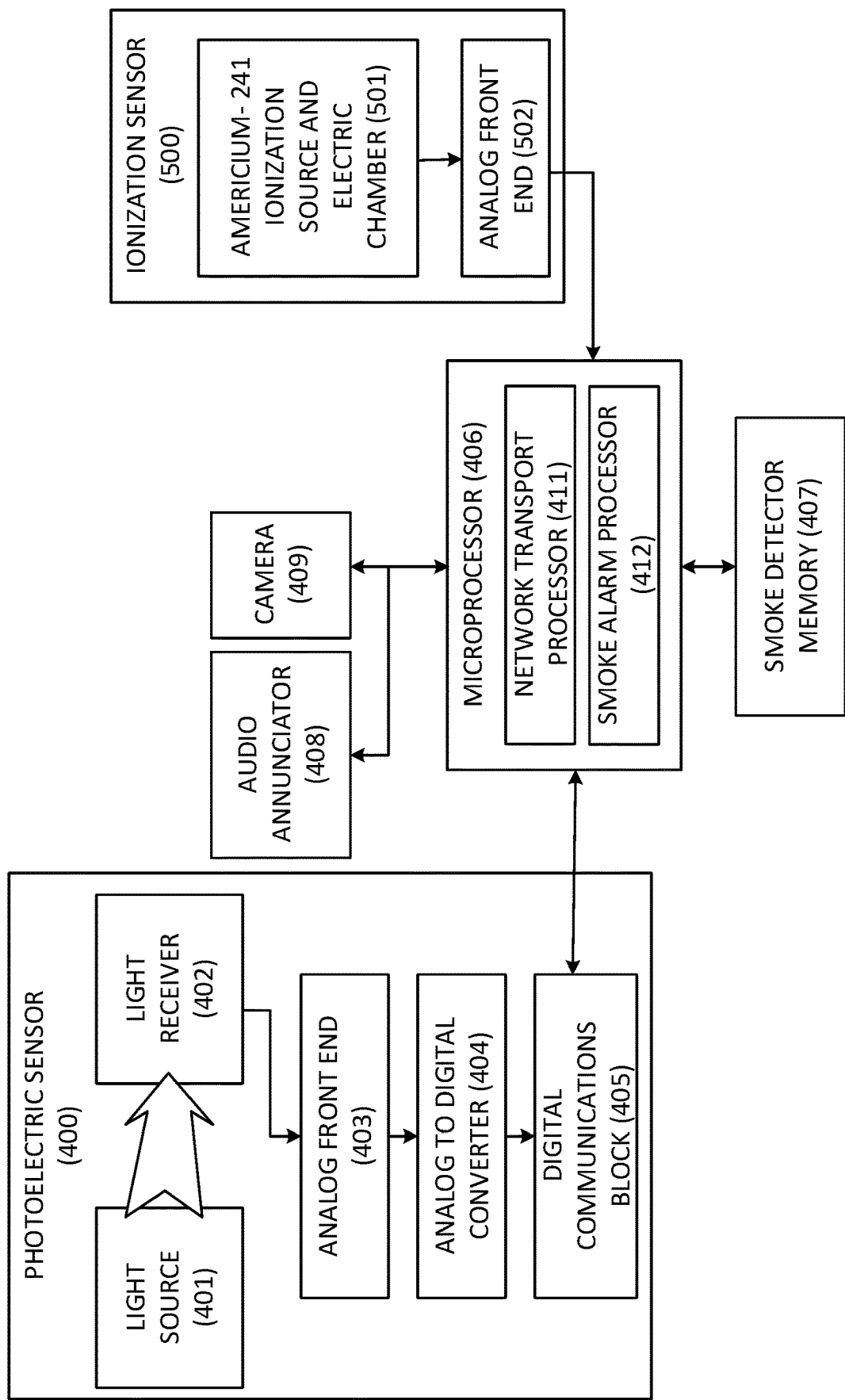
FIG. 5 illustrates a hardware configuration of a smoke detector with a photoelectric sensor and an ionization sensor for detecting smoke.

FIG. 5 illustrates a hardware configuration of smoke detector 200 with photoelectric sensor 400 and an ionization sensor 500 for detecting smoke. In one embodiment, smoke detector 200 can use one or more smoke detection system such as a photoelectric smoke detector and ionization smoke detector to detect smoke. In this embodiment, smoke detector 200 can comprise photoelectric sensor 400, microprocessor 406, smoke detector memory 407, audio speaker 408, a camera 409, and ionization sensor 500. Ionization sensor 500 can comprise an ionization chamber 501, and a second analog frontend amplifier 502. In one embodiment, ionization chamber 501 can comprise a radioactive material such as americium-241. In this embodiment, a small amount of americium-241 can be placed within ionization chamber 501 and can be used to detect smoke. Ionization chamber 501 can house radioactive material between two electrically charge plates. The radioactive material can ionize the air within ionization chamber 501 and can cause the current to flow between the plates. In the absence of smoke, a constant electric current can pass in between the plates and the amount of ions within the ionization chamber 501 can be steady. When smoke enters ionization chamber 501, the smoke can neutralize the charged particles therefore reducing the amount of ion within the chamber. This can then disrupt the electrical current between the two plates and causes ionization sensor 500 to send a signal to second analog front end amplifier 502. The signal from second analog front-end amplifier 502 can then be sent to microprocessor 406. And microprocessor 406 can then use the signal to perform sets of instructions according to the algorithms, and parameters stored within smoke detector memory 407.

Figure 6:
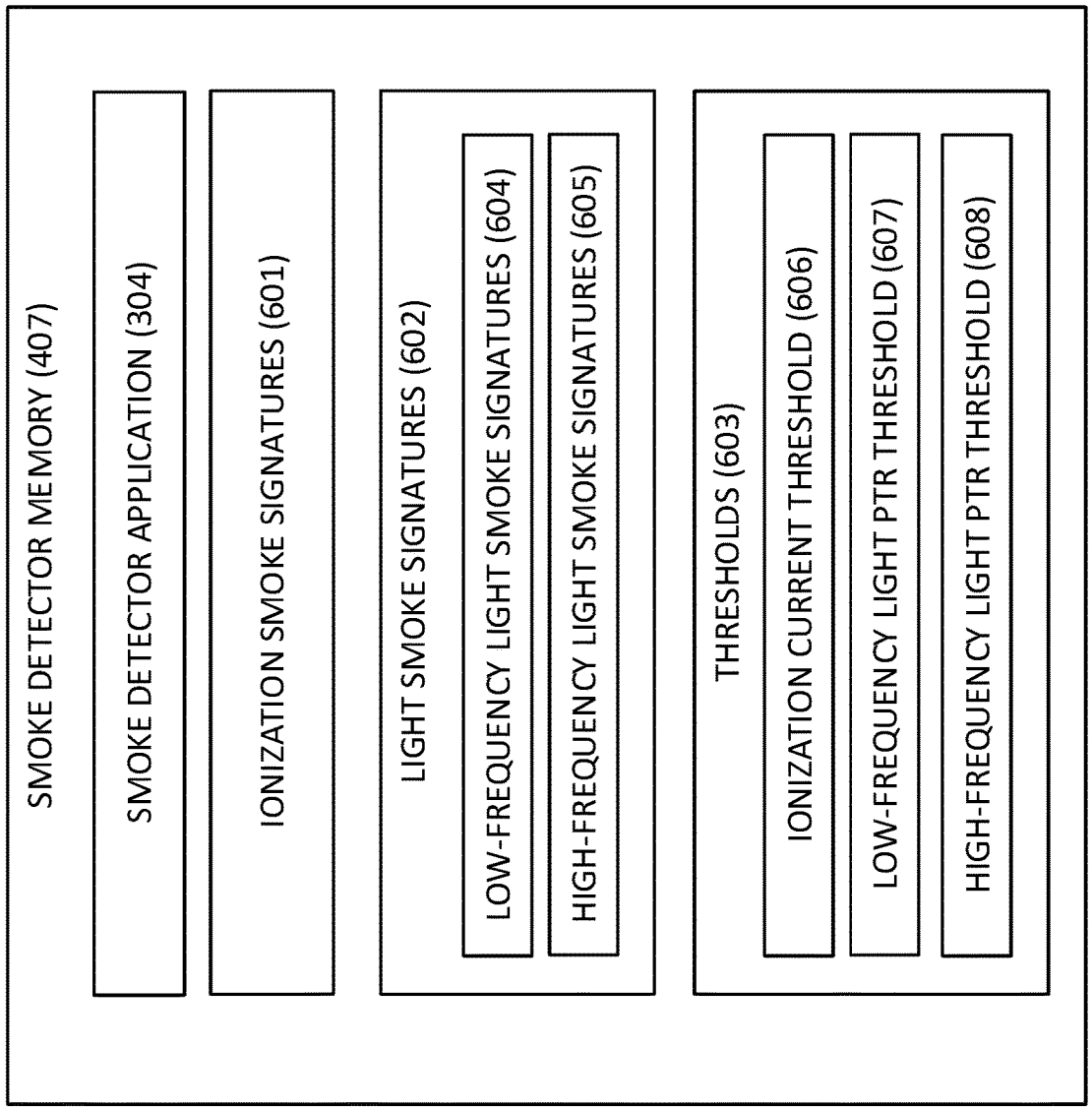
FIG. 6 illustrates a smoke detector memory.

FIG. 6 illustrates a smoke detector memory 407 comprising smoke detector application 304, a plurality of ionization smoke signatures 601, a plurality of light smoke signatures 602, and a plurality of thresholds 603. Each of ionization smoke signatures 601 can relate to how ionization chamber 501 interacts with one of the particulates. In one embodiment, light smoke signatures 602 can comprise a plurality of low-frequency light smoke signatures 604 and a plurality of high-frequency light smoke signatures 605. Each of low-frequency smoke signature 604 can relate to how a low-frequency light interacts with one of the particulates, and each of high-frequency light smoke signature 605 can relate how a high-frequency light interacts with one of the particulates. In one embodiment, thresholds 603 can comprise ionization PTR threshold 606, a low-frequency light PTR threshold 607 and a high-frequency light PTR threshold 608.

Figure 7A:
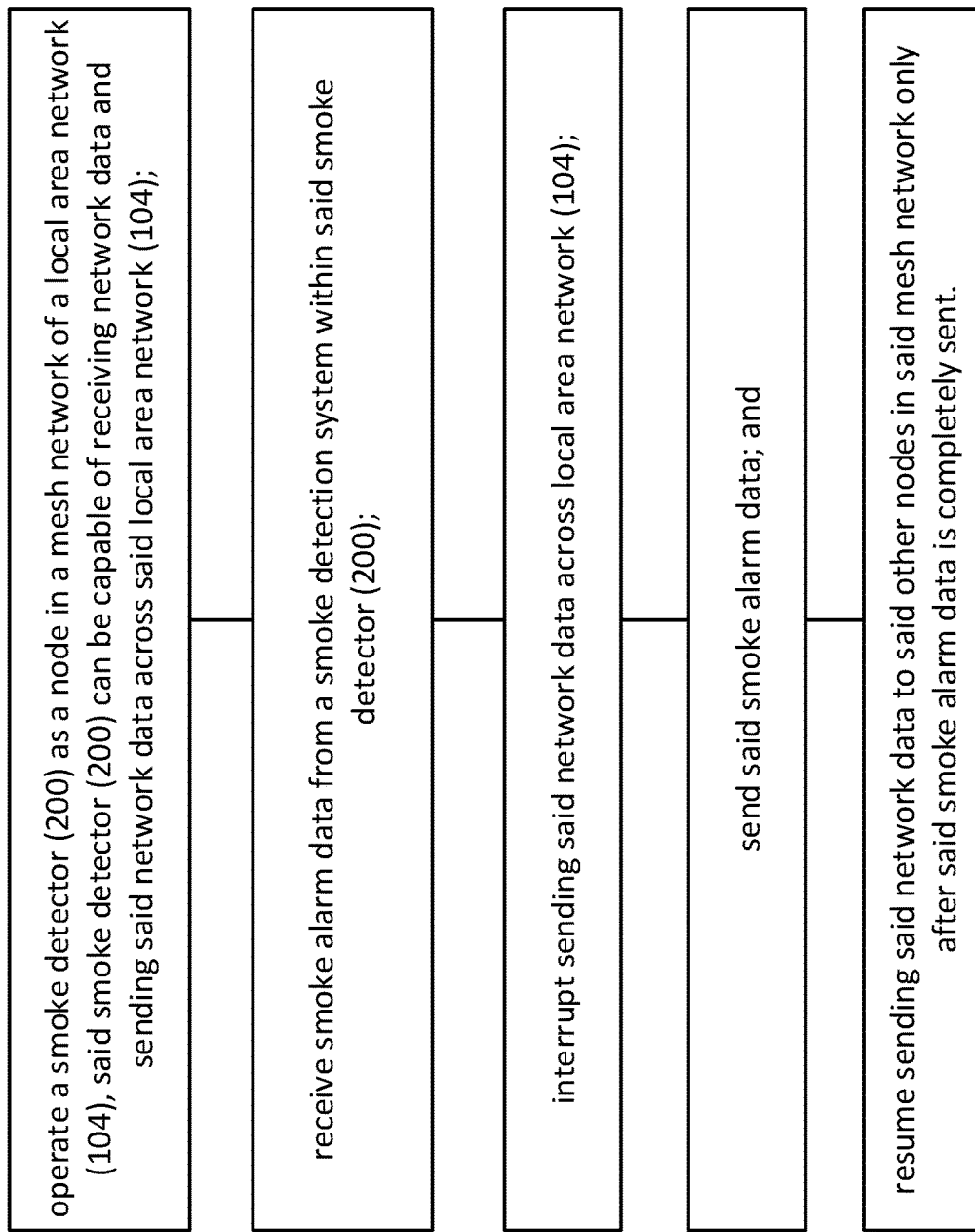
FIG. 7A illustrates an exemplary method of transmitting a smoke alarm data detected by a smoke detector.

FIG. 7A illustrates an exemplary method of transmitting a smoke alarm data 701 by smoke detector 200. Once smoke detectors 200 are installed and powered, smoke detector 200 can continuously scan for wired connectivity over Ethernet. Further, each smoke detector can be programmed with information about where it is located within a facility. For example, smoke detector 200a can be programmed by a user to know it is in a first-floor master bedroom while smoke detector 200b can be programmed to know it is in a kitchen. In one embodiment, smoke detector 200 can connect wirelessly or by wired connection. In a scenario wherein wired connectivity is lost on a first smoke detector 200a, first smoke detector 200a can be capable of establishing a Wi-Fi connection by hopping to the nearest available mesh connection point such as nearest smoke detector 200. In an embodiment wherein first smoke detector 200a is using Power over Ethernet (PoE), wired connectivity and power supply can be lost. In such embodiment, first smoke detector 200a can also check for power status. In the event that power is lost, first smoke detector 200a can proceed in checking the battery charge status. Next, first smoke detector 200a can send the first smoke detector's battery status and at the same time send the signal for the alarm for loss of wired connectivity over the mesh network. Further, smoke detectors 200 can continue to monitor the smoke through the smoke detection system. At the same time, smoke detectors 200 can seek to re-establish connection to LAN 104. Each smoke detector 200, upon receiving a loss of power information or battery status information from smoke detector 200a can prioritize such information over other information being transferred on LAN, to better ensure safety of users of the system.

Once smoke detectors 200 establishes that there is indeed a fire within the vicinity, smoke detector 200 can send a notification to home networking server 101. In return, home monitoring server 101 can notify and send information to emergency response server 102 to inform specific departments to respond to the fire. Each smoke detector 200, upon receiving notification of smoke or fire from smoke detector 200a can prioritize such information over other information being transferred on LAN 104, to better ensure safety of users of the system.

In one embodiment, a firetruck can be equipped with a wireless emergency personnel router 203 capable of establishing an emergency WIFI connection 201 to devices inside the home. To accommodate such emergency WIFI connection, fixed IP addresses can be reserved for and restricted to emergency personnel. In such embodiment, if a house is on fire, the router 202 may have already been destroyed, cutting off, orphaning smoke detectors 200. In such scenario, smoke detectors 200 could find firetruck router and start relaying data to that. In one embodiment, smoke detectors 200 can be configured to connect to wireless emergency personnel router 203 immediately when wireless emergency personnel router 203 is discovered by smoke detector 200. In another embodiment smoke detectors 200 can be configured to connect to wireless emergency personnel router 203 immediately when wireless emergency personnel router 203 is discovered by smoke detector 200 if and only if smoke detector 200 or any other smoke detector 200 connected to smoke detector within a common mesh network is detecting smoke.

Once connected to wireless emergency personnel router 203, smoke detectors 200 can send smoke alarm data 701 to the router 203 of the fire truck. In one embodiment, smoke detection data can include a location where smoke has been detected, a type of smoke detected (e.g., smoke smoldering or fast burning), captured image and video files of fires, and/or a floor plan that show the areas where smoke has been detected. Such information can aid responders to strategically respond to the fire.

Further in one embodiment, each smoke detector 200 can comprise a single microprocessor 406. In such embodiment, microprocessor 406 can comprise both network transport processor 411 and smoke alarm processor 412. The network transport processor can allow microprocessor 406 to operate as a node while the smoke alarm processor 412 can allow microprocessor 406 to receive smoke alarm data 701 from the smoke detection system. In an example embodiment wherein fire is not yet apparent in an area, smoke detector 200a can operate as a node in a mesh network by receiving and sending network data 702 across LAN 104. And in an event wherein fire starts to develop within the area, microprocessor 406 can receive smoke alarm data 701 from smoke detection system within smoke detector 200. In such event, smoke detector 200a can interrupt sending network data 702 across LAN 104 and starts sending the smoke alarm data 701 across LAN 104. In one embodiment, smoke detector 200a can send the smoke alarm data to home monitoring server 101. In such embodiment, home monitoring server 101 can send smoke alarm data 701 to emergency response servers 102. In return, emergency response servers 102 can store smoke alarm data 701 on server data storage 305 and notify specific departments to respond to the fire. In another embodiment, smoke detector 200a can send the smoke alarm data directly to emergency response servers 102. Further in another embodiment, in a scenario wherein smoke detector 200a can find wireless emergency personnel router 203 nearby, smoke detector 200a can start establishing WIFI connection 201 with wireless emergency personnel router 203 and start sending the smoke alarm data to the wireless emergency personnel router. Furthermore, once smoke alarm data 701 can be completely sent, smoke detector 200a can resume sending and receiving network data 702 to other smoke detectors 200 in mesh network.

FIG. 7B illustrates another exemplary method of transmitting smoke alarm data 701 received from a second smoke detector. In one embodiment, smoke detector 200 can comprise a plurality of microprocessor 406. In such embodiment, smoke detector 200 can comprise a processor dedicated for network transport and a processor dedicated for smoke detection. In this embodiment, smoke detector 200 can be capable of operating as a node and while operating as a node, can operate as smoke detection system. In one embodiment, smoke detector 200a can operate as a node in mesh network of LAN 104. As such, smoke detector 200a can receive network data 702 and send network data 702 across LAN 104. And in a scenario wherein a second smoke detector 200b can start detecting a smoke within the second smoke detector's area, second smoke detector 200b can start sending smoke alarm data 701 over mesh network. In one embodiment, smoke alarm data 701 can comprise a map related to the location of second smoke detector 200b. In another embodiment, smoke alarm data 701 can comprise images captured by camera 409 on second smoke detector 200b. In such embodiment, upon detecting smoke within the second smoke detector's area, microprocessor 406 on second smoke detector 200b can send a signal to camera 409 turning the camera on. As such, camera 409 on smoke detector 200a can start capturing images and/or videos of the area. Further in another embodiment, smoke alarm data 701 from second smoke detector 200b can comprise a fire type. In this embodiment, smoke detection system of smoke detectors 200 can be capable of identifying if smoke detected from an area can be from smoldering fire, or fast burning fire. Further in a scenario wherein wired connection can still be available, second smoke detector 200b can send smoke alarm data 701 through wired connection. In another scenario wherein wired connection can be lost, second smoke detector 200b can start establishing WIFI connection 201 to the nearest smoke detector 200 and then send smoke alarm data 701 across LAN 104.

In such scenario, smoke detector 200a while still operating as node, can start receiving smoke alarm data 701 from second smoke detector 200b and can receive other data within network data 702. Upon receiving alarm data from second smoke detector 200b, smoke detector 200a can send a signal to audio speaker 408. In return, audio speaker 408 can initiate sounding an audible alarm. Simultaneously, upon receiving smoke alarm data 701 from second smoke detector 200b, smoke detector 200a can halt sending other data and then start sending the smoke alarm data 701 across LAN 104. Furthermore, once smoke alarm data 701 can be completely sent, smoke detector 200a can resume sending and receiving network data 702 to other smoke detectors 200 in mesh network.

Figure 7C:
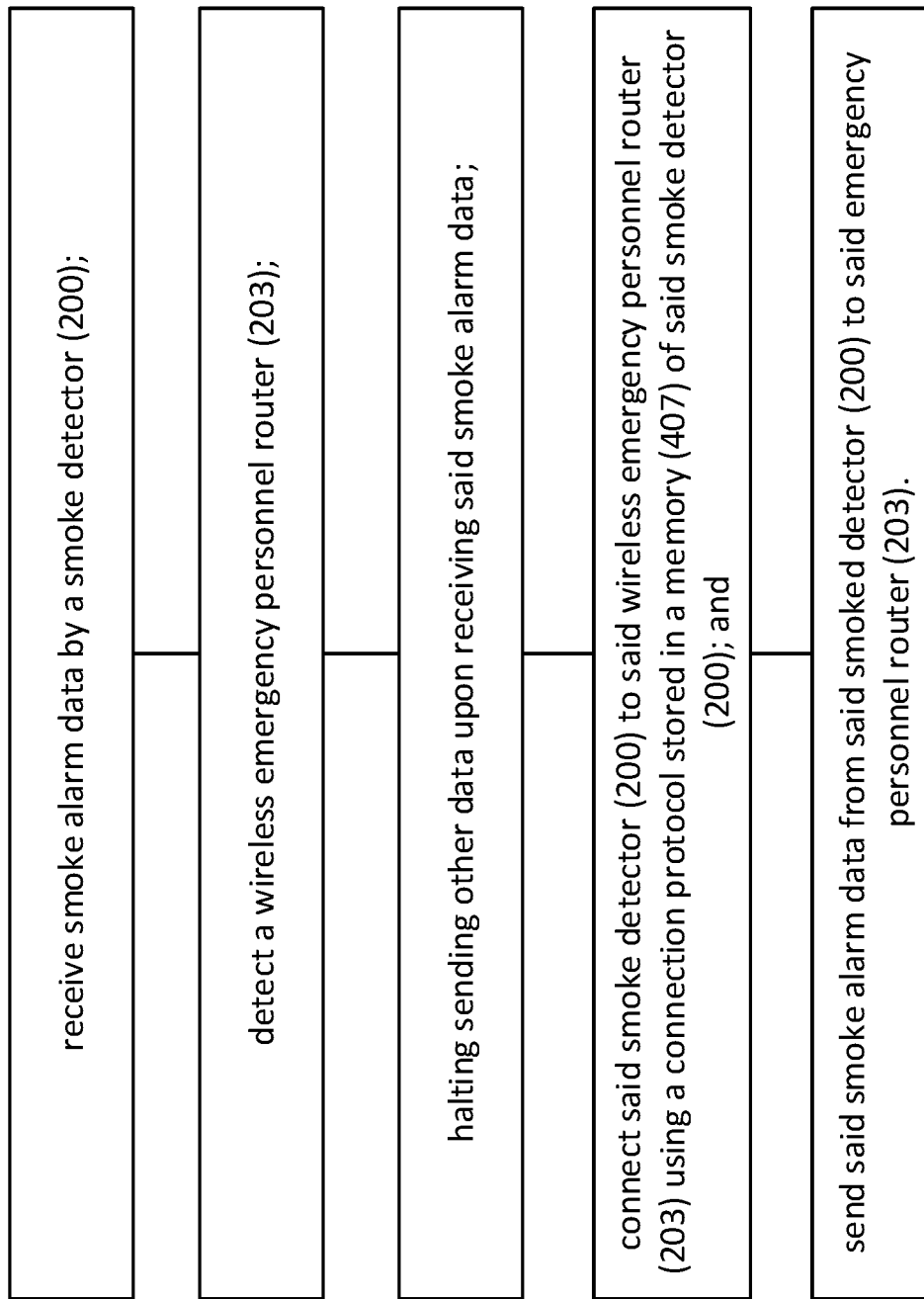
FIG. 7C illustrates another exemplary method of transmitting smoke alarm data by a smoke detector and sending smoke alarm data to an emergency personnel router.

FIG. 7C illustrates another exemplary method of transmitting smoke alarm data by a smoke detector and sending smoke alarm data to an emergency personnel router 203. In one embodiment, when fire starts to develop in an area wherein smoke detector 200a can be located, smoke detector 200a can be capable of receiving smoke alarm data 701 through the smoke detection system of smoke detector 200a. Microprocessor 406 can also detect wireless emergency personnel router 203 that can be nearby. Once detected, microprocessor 406 can connect to wireless emergency personnel router using a connection protocol, and then send smoke alarm data 701 via emergency personnel router 203. In another embodiment, a fire can come from a different area and can be detected by a second smoke detector 200b. In this embodiment, upon the detection of smoke by second smoke detector 200b, second smoke detector 200b can begin sending smoke alarm data 701 across LAN 104. In such embodiment, smoke detector 200a can first connect to LAN 104 to receive smoke alarm data 701 from second smoke detector 200b. In an embodiment wherein wired connection can still be working, smoke detector 200a can receive smoke alarm data 701 through a wired connectivity. In another embodiment wherein wired connection can be lost due to fire, smoke detector 200a can receive smoke alarm data 701 through the mesh network. In one embodiment, upon receiving smoke alarm data 701 by smoke detector 200a, microprocessor 406 can disconnect from LAN 104. In one embodiment, the connection protocol can comprise one or more IP addresses from wireless emergency personnel router 203. In such embodiment, smoke detector 200a can detect one of the one or more IP addresses from a signal from wireless emergency personnel router 203. Then smoke detector 200*a* can connect to one of the one or more IP addresses. In another embodiment, the connection protocol can comprise a range of IP addresses. In such embodiment, smoke detector 200*a* can detect an IP address from a signal from wireless emergency personnel router 203 and then connect to the IP address. The signal can comprise an IP address within the range of IP addresses. Further in another embodiment, the connection protocol can comprise an SSID. In such embodiment, smoke detector 200*a* can detect SSID broadcast in a signal by wireless emergency personnel router 203 and then connect to SSID broadcast by the wireless emergency personnel router 203.

FIG. 8A illustrates photoelectric sensor comprising a single light source 401. In one embodiment, photoelectric sensor 400 can comprise a single light source 401, a light receiver 402, a light catcher 801, and a photoelectric sensor chamber (PES) chamber 802. In a preferred embodiment, light source 401 emits a high-frequency wavelength such as blue or higher. When no particulates are within a photoelectric sensor (PES) chamber 802, a first light signal 803*a* travels from light source 401 to light catcher 801 without refraction. As such, light receiver 402 senses little or none of first light signal 803*a*. As particulates 804 enter PES chamber 802, the particulates can cause first light signal 803*a* to refract, and light receiver 402 begins to receive a portion of first light signal 803*a*. The more smoke enters PES chamber 802 the more light first light signal 803*a* is refracted toward light receiver 402. Light receiver 402 can transmit light data to microprocessor 406. Light data can be analyzed by microcontroller, as discussed further below.

Figure 8B:
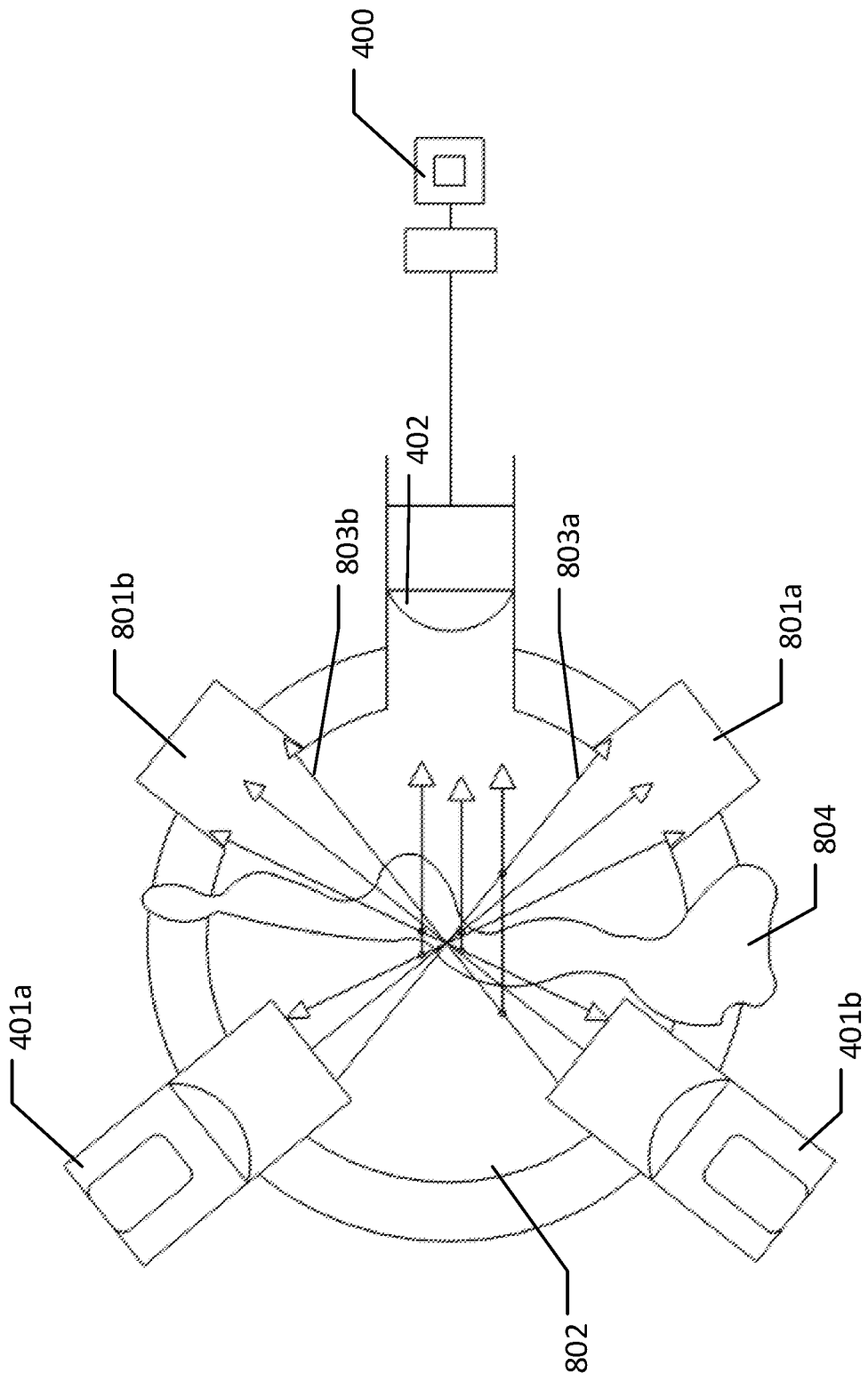
FIG. 8B illustrates photoelectric sensor comprising two light sources.

FIG. 8B illustrates photoelectric sensor comprising two light sources 401. In one embodiment, photoelectric sensor 400 can comprise a low-frequency light source 401*a*, a high-frequency light source 401*b*, one or more light catchers 801, and a light receiver 402, and a PES chamber 802. For purposes of this disclosure light receiver 402 can comprise of multiple receivers, each configured to receive a particular wavelength. For example, light receiver 401*b* can comprise a high-frequency light receiver and a low-frequency light receiver. In a preferred embodiment, high-frequency light source 401*b* emits a high-frequency light signal such as blue or higher while low-frequency light source 401*a* emits low-frequency light such as red or infrared. When no particulates are within a photoelectric sensor (PES) chamber 802, a first light signal 803*a* travels from light source 401 to light catcher 801*a* without refraction. Similarly, second light signal 803*b* travels from light source 401 to light catcher 801*b* without refraction As such, light receiver 401 senses little or none of first light signal 803*a*. As particulates 804 enter PES chamber 802, the particulates first light signal 803*a* and second light signal 803*b* begin to refract, and light receiver 402 begins to receive a portion of first light signal 803*a* and 803*b*. The more smoke enters PES chamber 802 the more light first light signal 803*a* is refracted toward receiver 402, however, depending on the size of particulates, first light signal 803*a* and second light signal 803*b* can refract more or less depending on each frequency. Light receiver 402 can transmit light data to microprocessor 406.

Figure 9A:
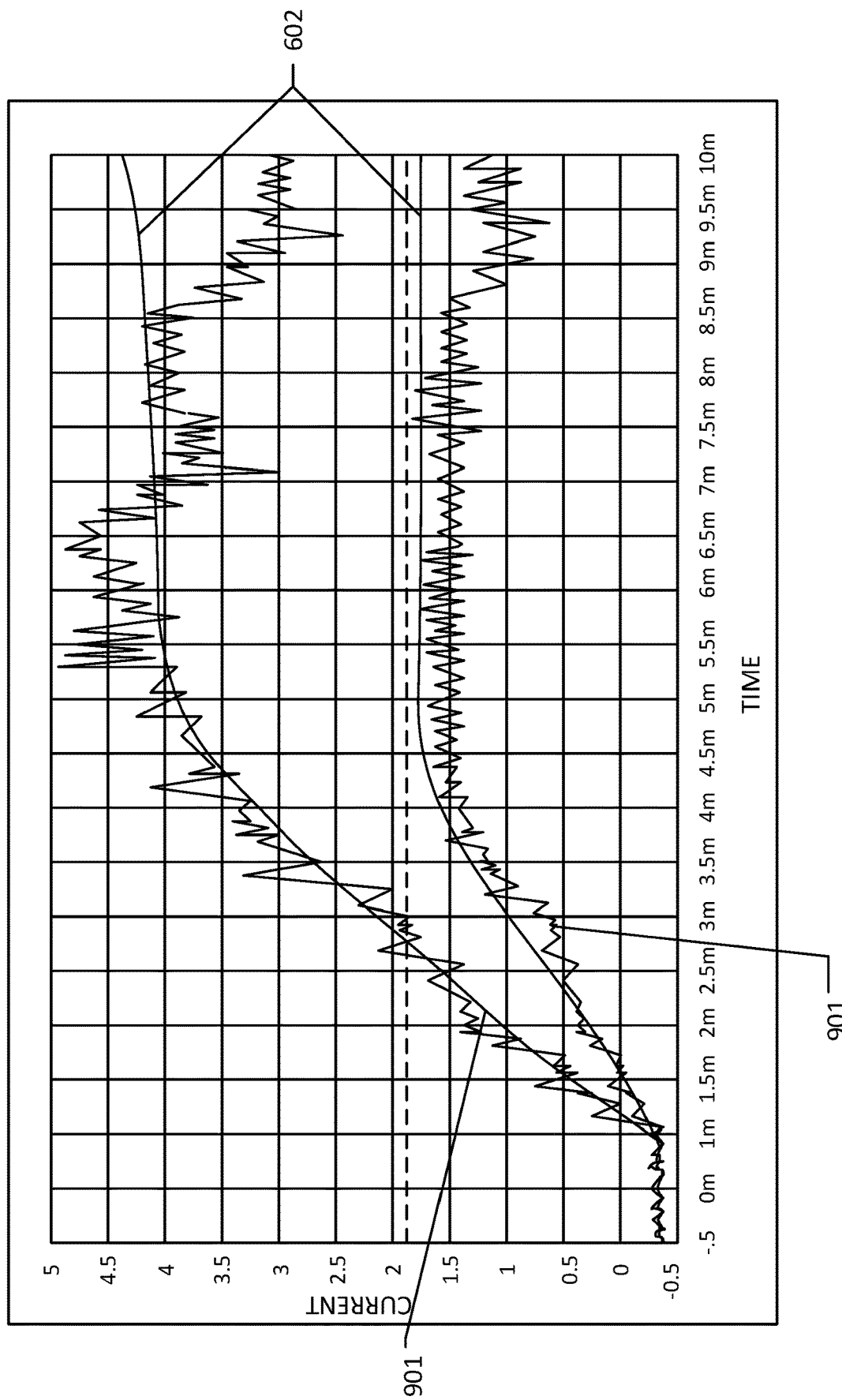
FIG. 9A illustrates high frequency light data and low-frequency light data being compared with a high-frequency light smoke signature and a low-frequency light smoke signature, in a scenario in which polyester is burning.

FIG. 9A illustrates high frequency light data and low-frequency light data being compared with a high-frequency light smoke signature 605 and a low-frequency light smoke signature 604, in a scenario in which polyester is burning. Light data 901 can comprise high-frequency light data and low-frequency light data. Such data can be analyzed by microcontroller 405. Further, when light hits a particle near the size or smaller than its wavelength, it tends to refract less. As such, low frequency light 401*a* may refract less than high frequency light 401*b* if particles are sufficiently small. High frequency light data and low frequency light data are compiled by taking readings over time of the high frequency light 401*b* and low frequency light 401*a*, each time determining a power transfer ratio (PTR). High frequency smoke signatures can, in one embodiment, be compiled high-frequency PTR data. Similarly, low frequency smoke signatures can, in one embodiment, be compiled low-frequency data. By comparing high and low frequency light data to a plurality of high and low light smoke signatures respectively, a size of particulates can be inferred which can be indicative of the type of particle. For example, such analysis could be used to distinguish between smoke and dust, thereby preventing a false-positive alarm.

In one embodiment, analysis can determine whether high-frequency light PTR data has exceeded a high-frequency PTR threshold 608. Similarly, analysis can determine whether low-frequency light PTR data has exceeded a low-frequency PTR threshold 607. Furthermore, in one embodiment, an analysis to determine whether an alarm sequence should be run can be determined by looking to both low-frequency light data and high-frequency light data.

In another embodiment, microprocessor can analyze high-frequency light data and/or low-frequency light data to see the rate in which PTR data changes. For example, in the case of a burning sofa cushion in FIG. 9A, there is a rapid rate of change.

Figure 9B:
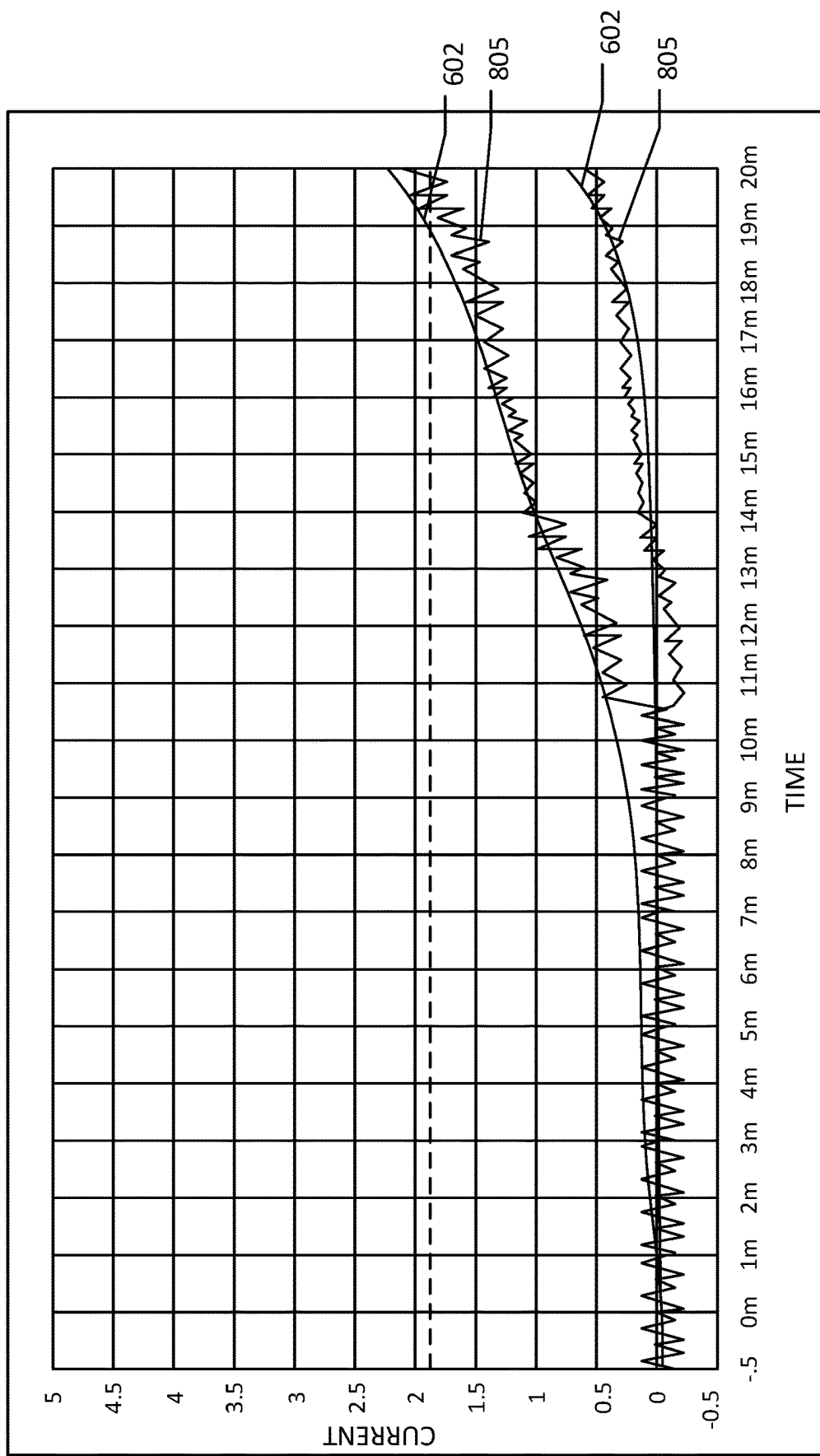
FIG. 9B illustrates-high frequency light data and low-frequency light data being compared with a high-frequency light smoke signature and a low-frequency light smoke signature, in a scenario in which a hamburger is burning on the stove.

FIG. 9B illustrates high frequency light data and low-frequency light data being compared with a high-frequency light smoke signature and a low-frequency light smoke signature, in a scenario in which a hamburger is burning on the stove. By comparison, the hamburger, an organic material burns much slower. Microprocessor 405, when receiving light data as shown in FIG. 9B, can compare the light data to smoke profiles, and recognize such data fits the curve of burning organic material. In this case, an alarm will not initiated since such curve and its related particulates are not indicative of a fire.

Figure 10:
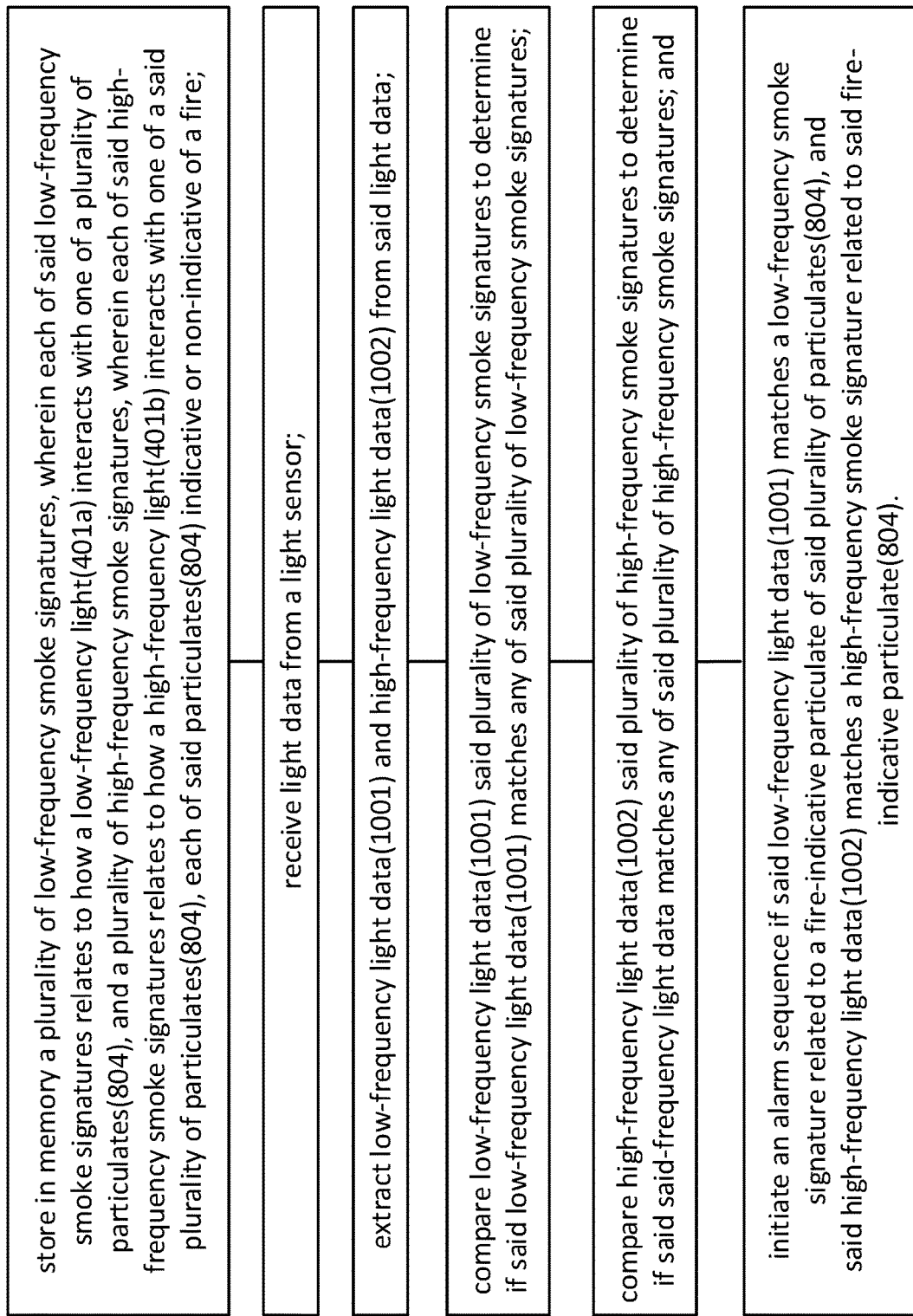
FIG. 10 illustrates an exemplary method for detecting smoke using a photoelectric sensor.

FIG. 10 illustrates an exemplary method for detecting smoke using a photoelectric sensor. Firstly, low-frequency light smoke signatures 604 and high-frequency light smoke signatures 605 can be stored in smoke detector memory 407. Each of the low-frequency smoke signatures 604 relates to how a low-frequency light interacts with one of a plurality of particulates 804, and each of high-frequency smoke signatures 605 relates to how a high-frequency light interacts with one of a plurality of particulates 804. Each of particulates 804 can be indicative or non-indicative of a fire.

Further, photoelectric sensor 400 can detect a change in light intensity of light source 401. As particulates 804 enters PES chamber 802, photoelectric sensor 400 can detect particulates presence and transmits a signal to light receiver 402. Light receiver 402 can send light data 901 to microprocessor 406 to be analyzed. Upon receiving light data 901, microprocessor 406 can extract a low-frequency light data 1001 and a high-frequency light data 1002 from light data 901. Then, microprocessor 406 can compare low-frequency light data 1001 with low-frequency light smoke signatures 604 to determine if low-frequency light data 1001 matches any of low-frequency light smoke signatures 604. Furthermore, microprocessor can also compare high-frequency light data 1002 with high-frequency light smoke signatures 605 to determine if high-frequency light data 1002 matches any of high-frequency light smoke signatures 605. Then, microprocessor 406 can initiate an alarm sequence if low-frequency light data 1001 matches low-frequency light smoke signature 604 related to a fire-indicative particulate, and if high-frequency light data 1002 matches high-frequency light smoke signature 605 related to fire-indicative particulate. In one embodiment, each of low-frequency smoke light signatures 604 can comprise low-frequency power-transfer-ratio (PTR) data, and each of high-frequency smoke light signatures 605 comprises stored high-frequency PTR data. In such embodiment, comparing low-frequency light data 1001 to the low-frequency smoke signatures 604 can comprise curve matching low-frequency light data 1001 to stored low-frequency PTR data. Further in such embodiment, comparing high-frequency light data 1002 to high-frequency smoke signatures 605 can comprise curve matching high-frequency light data 1002 to stored high-frequency PTR data. In one embodiment, comparing low-frequency light data 1001 to low-frequency smoke light signatures 604 can comprise determining whether the low-frequency light data 1001 reaches a predetermined PTR threshold. In another embodiment, comparing the high-frequency light data 1002 to high-frequency smoke signatures 605 can comprise determining whether high-frequency light data 1002 reaches a predetermined PTR threshold.

Figure 11A:
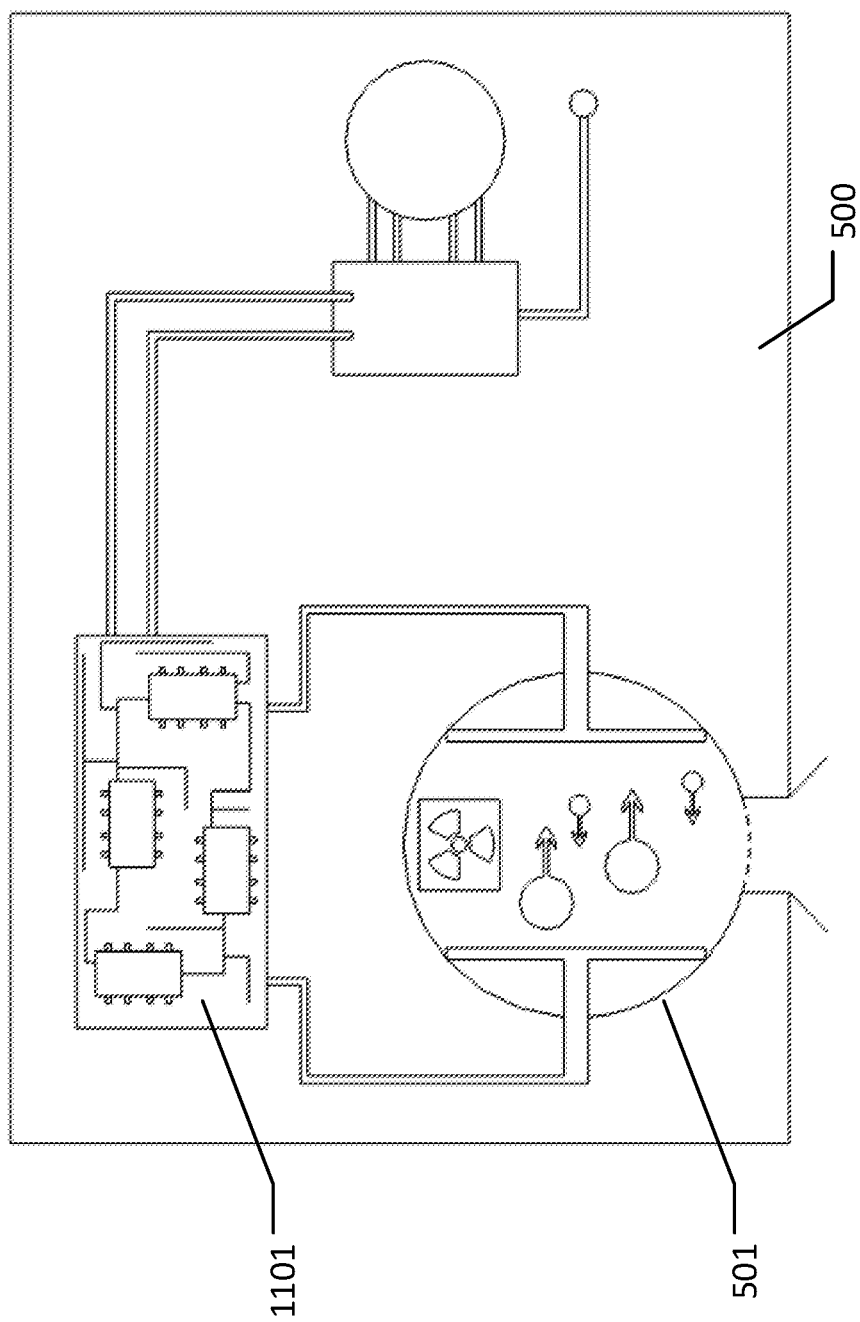
FIG. 11A illustrates an ionization sensor with no particulates in an ionization chamber.

FIG. 11A illustrates ionization sensor 500 with no particulates 804 in an ionization chamber 501. In one embodiment, ionization sensor 500 can comprise a radioactive element, a circuit 1101 and ionization chamber 501. When no particulates 804 are within ionization chamber 501, a current will flow through circuit 1101 and such circuit will send current data to microprocessor 406.

Figure 11B:
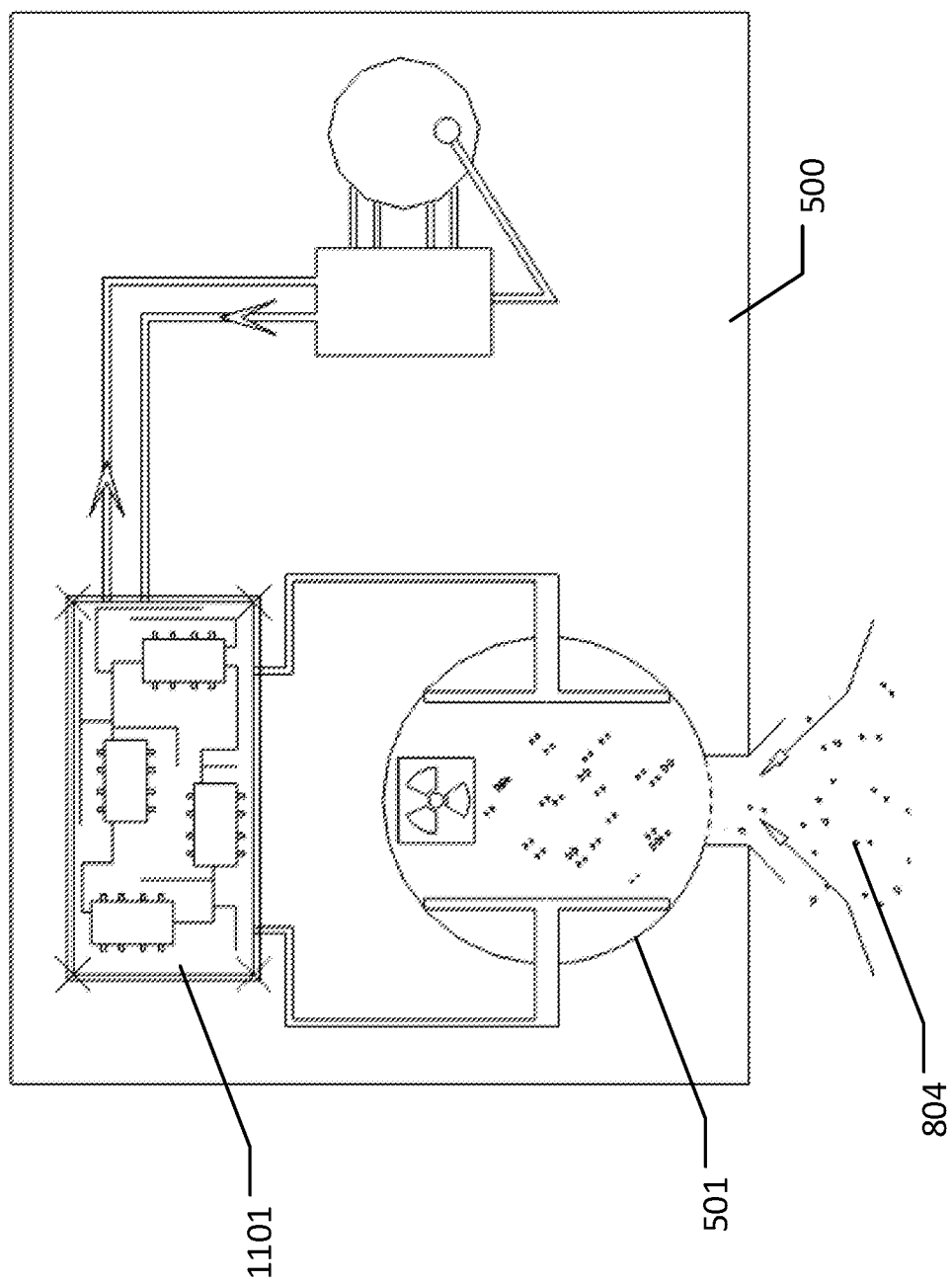
FIG. 11B illustrates an ionization sensor with particulates enter ionization chamber.

FIG. 11B illustrates ionization sensor 500 with particulates enter ionization chamber. As particulates 804 enter ionization chamber 501, current flowing through circuit 1101 decreases, current data reflecting such change. Current data can be analyzed by microprocessor 406, as discussed further below to determine whether particulates are indicative of a fire.

Figure 11C:
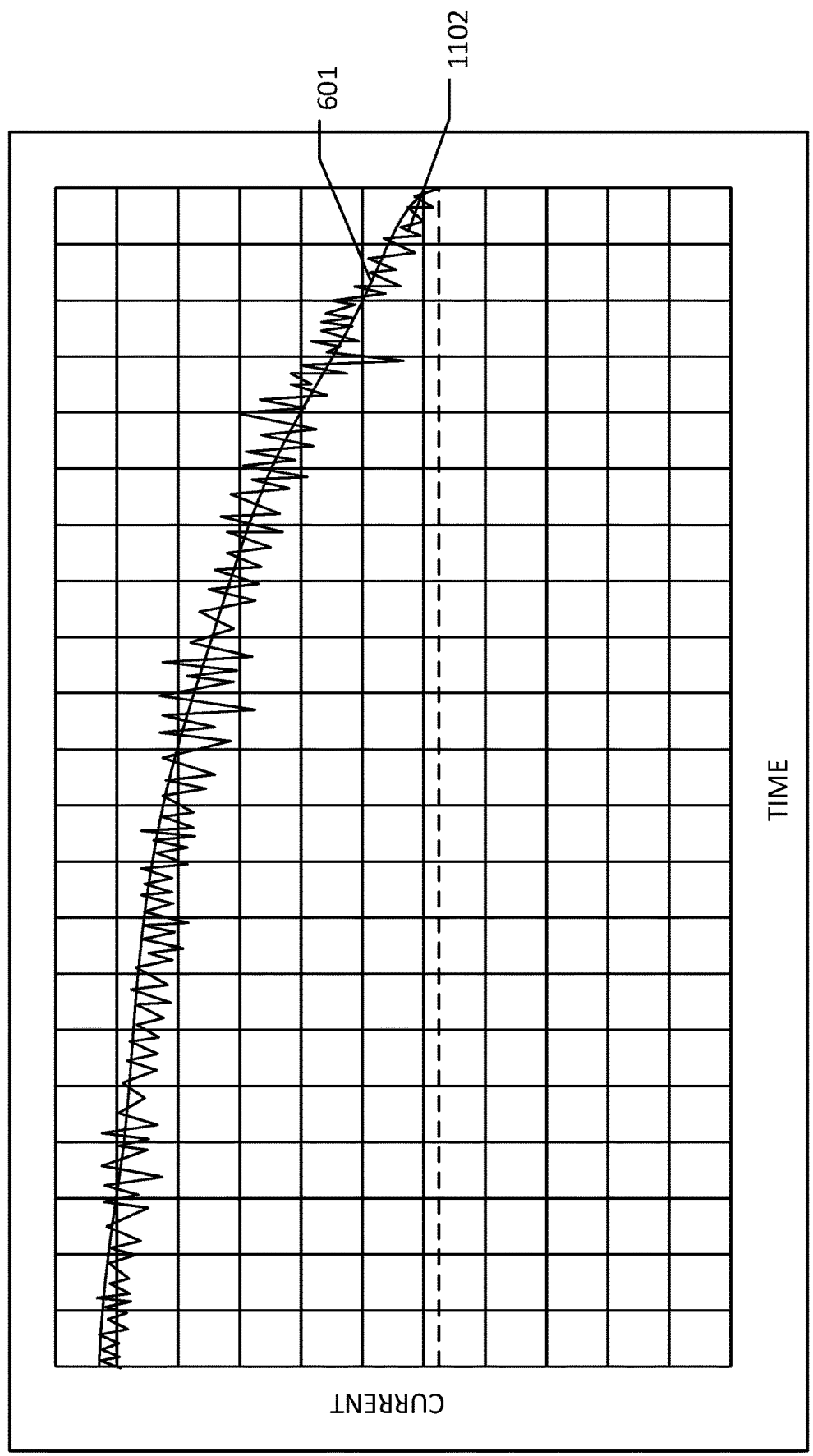
FIG. 11C illustrates current data being compared with ionization smoke signature, in a scenario in which a sofa cushion is burning.

FIG. 11C illustrates current data 1102 being compared with ionization smoke signature, in a scenario in which polyester is burning. As shown on the graph, as particulates 804 fill ionization chamber 501, they quickly cut off current flow in the circuit causing a drop in current in current data 1102. Curve comparison as shown in FIG. 11C can be accomplished using numerical methods known in the art to determine if current data 1102 matches any ionization smoke signature stored in memory 407, such as the ionization smoke signature 601 shown in FIG. 11C.

In one embodiment, analysis can determine whether ionization current data 1102 has dropped below an ionization current threshold 606. If so, and alarm sequence can be initiated. In another embodiment, microprocessor 406 can analyze ionization current data to see the rate in which ionization current data 1102 changes. For example, in the case of a burning sofa cushion in FIG. 11C, there is a rapid drop in current.

Figure 11D:
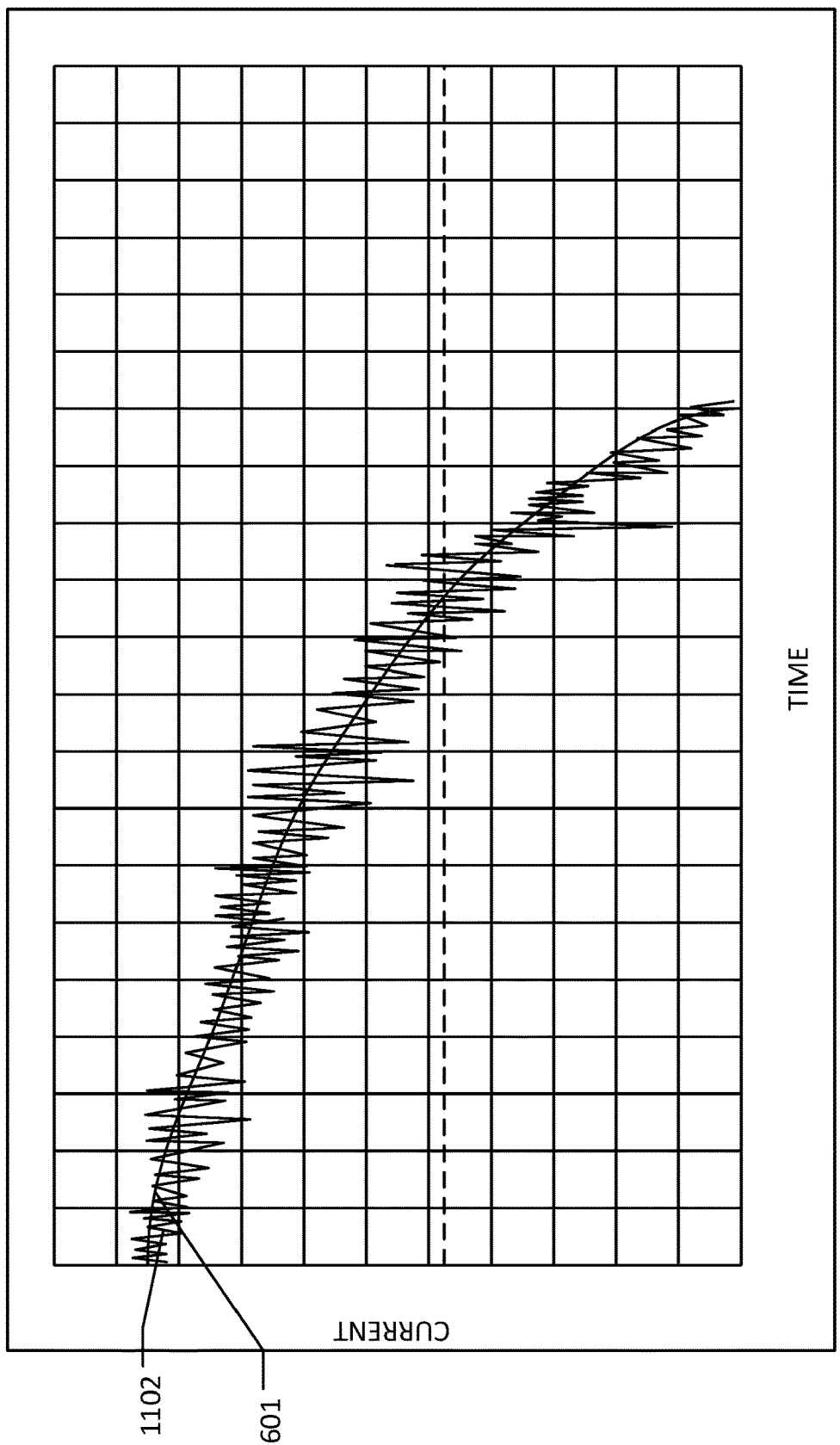
FIG. 11D illustrates current data being compared with ionization smoke signature, in a scenario in which a hamburger is burning.

FIG. 11D illustrates ionization current data being compared with ionization smoke signature 601, in a scenario in which a hamburger is burning on the stove. By comparison, the hamburger, an organic material burns much slower than a couch cushion. Microprocessor 406, when receiving ionization current data as shown in FIG. 11D, can compare the ionization current data to ionization smoke profiles, and recognize such data fits the curve of burning organic material. In this case, an alarm will not be initiated since such curve and its related particulates are not indicative of a fire.

In another embodiment, microprocessor 406 can consider ionization current data along with light data from photoelectric sensor 400. In one embodiment, light data can be related to a single light source 401. In another embodiment, light data can be related to two light sources, a high frequency light 401b and a low frequency light 401a.

Figure 12:
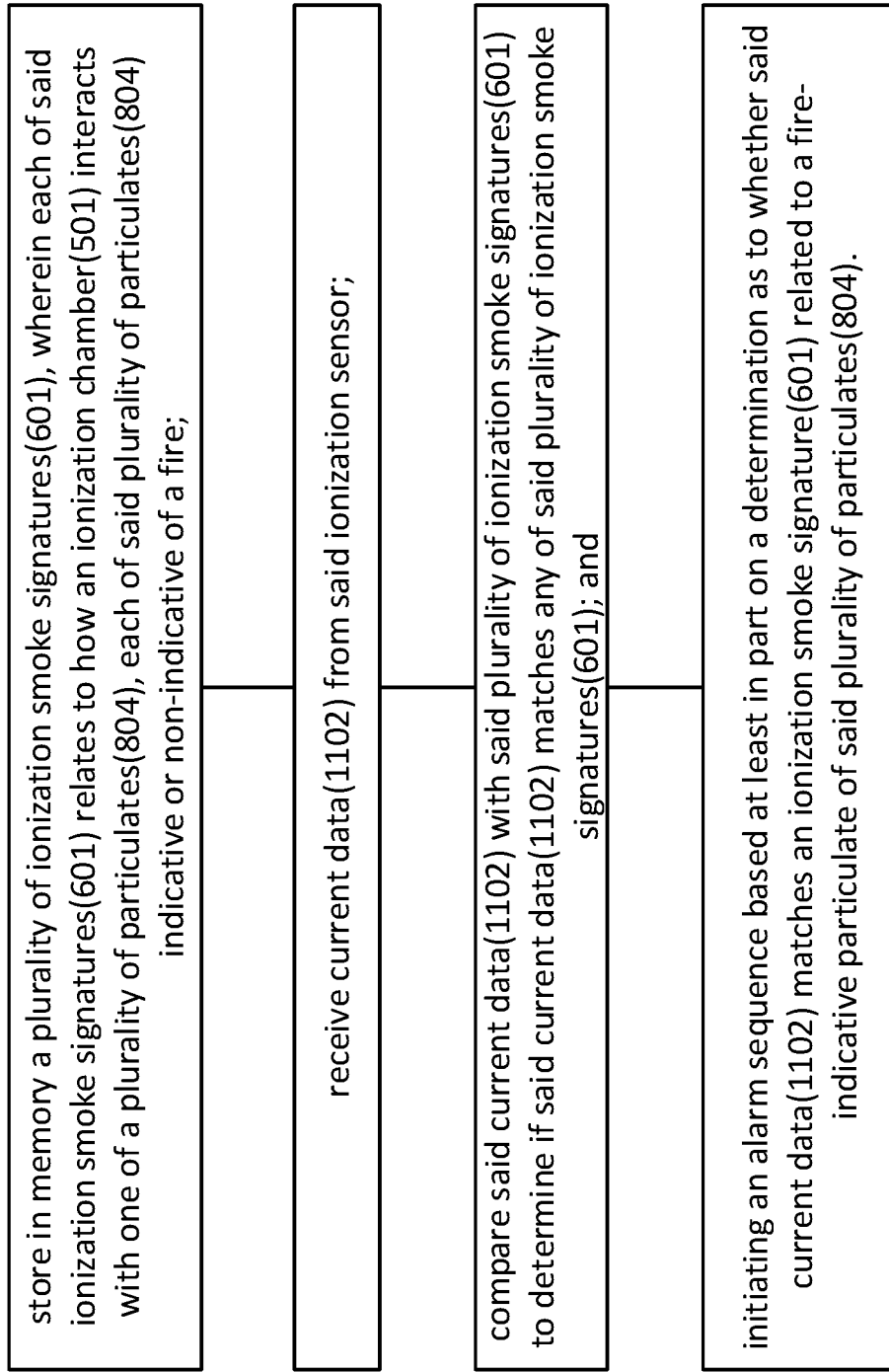
FIG. 12 illustrates an exemplary method for detecting smoke using an ionization sensor.

FIG. 12 illustrates an exemplary method for detecting smoke using an ionization sensor 500. Initially, ionization smoke signatures 601 can be stored within smoke detector memory 406, wherein each of ionization smoke signatures 601 relates to how ionization chamber 501 interacts with one of particulates 804. When smoke detector 200 is in use, microprocessor 406 can receive current data 1102 from ionization sensor 400. Microprocessor 406 can compare current data 1102 with ionization smoke signatures 601 to determine if current data 1102 received matches any of ionization smoke signatures 601. Then, microprocessor 406 can initiate an alarm sequence based at least in part on a determination as to whether current data 1102 received matches an ionization smoke signature 601 related to a fire-indicative particulate of particulates 804. In one embodiment, microprocessor 406 can store a plurality of first light smoke signatures within smoke detector memory 407, receive first light data compare first light data with first light smoke signatures to determine if first light data matches any of first smoke signatures. Then, microprocessor 406 can initiate the alarm sequence further based at least in part on an additional determination as to whether first light data matches first light smoke signatures related to fire indicative particulate. In such embodiment, microprocessor 406 can store in smoke detector memory 407 a plurality of second light smoke signatures, wherein each of second light smoke signatures relates to how a second light signal from a second light source interacts with one of particulates 804. Moreover, microprocessor 406 can receive second light data, compare second light data with second light smoke signatures to determine if second light data matches any of second smoke signatures, and initiate the alarm sequence further based at least in part on a second additional determination as to whether second light data matches a second light smoke signatures related to second indicative particulate.

In an embodiment, wherein first light source is a low-frequency light source and second light source is a high-frequency light source, each of the first light smoke signatures can comprise stored first light power-transfer-ratio (PTR) data, and each of second light smoke signatures can comprise stored second light PTR data. In an embodiment wherein low-frequency light can be red, comparing first light data to first light smoke signatures can comprise curve matching first light data to stored first light PTR data. In another embodiment, wherein low-frequency light can be red, comparing second light data to second light smoke signatures can comprise curve matching second light data to stored second light PTR data. In an embodiment, wherein first light source is a low-frequency light source and second light source is a high-frequency light source, comparing first light data to first light smoke signatures can comprise determining whether first light data reaches a first light predetermined PTR threshold.

In one embodiment, comparing second light data to the smoke signatures can comprise determining whether the second light data reaches a first light predetermined PTR threshold. In an embodiment, wherein first light source is a low-frequency light source and second light source is a high-frequency light source, each of the first light smoke signatures can comprise stored ionization power-transfer-ratio (PTR) data. In such embodiment, comparing ionization data to ionization smoke signatures can comprise curve matching ionization data to stored ionization PTR data.

Figure 13:
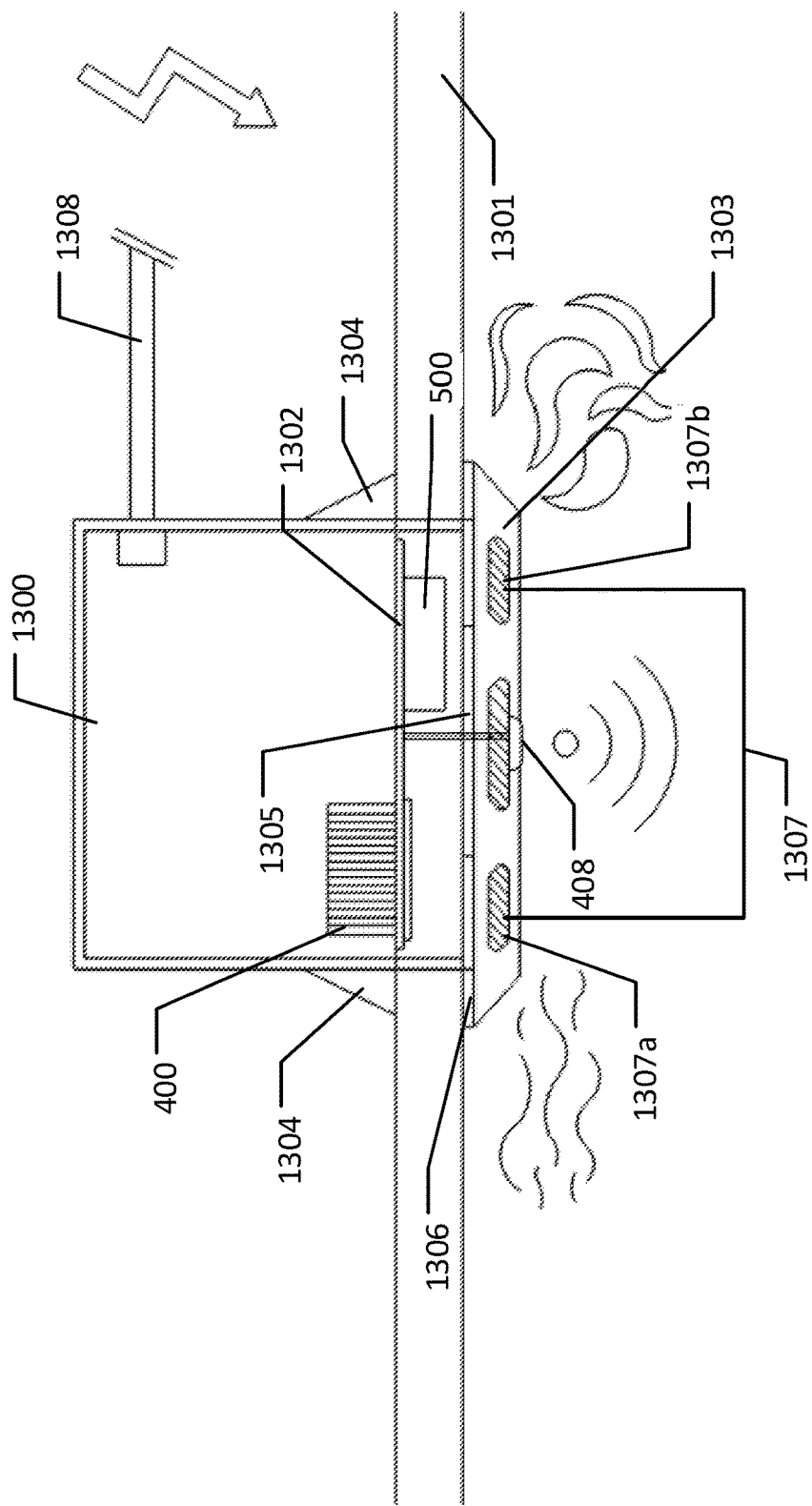
FIG. 13 illustrates a housing for a smoke detector, the housing capable of recessed installation.

FIG. 13 illustrate a housing 1300 for a smoke detector 200. In one embodiment, housing 1300 can be capable of recessed installation. In one embodiment, the smoke detector for recessed installment can comprise housing 1300, a printed circuit board (PCB) 1302, a bottom cover 1303, and a plurality of clips 1304. In one embodiment, housing 1300 can be installed within a surface 1301. As such, the top portion of housing 1300 can be embedded within surface 1301 and out of sight while bottom cover 1303 can be accessible to the outer environment. In one embodiment, surface 1301 can be a drywall. In another embodiment, surface 1301 can be plywood. In one embodiment, housing 1300 can have a quadrilateral shape. In one embodiment, PCB 1302 can comprise one or more smoke detection systems. In an embodiment wherein PCB 1302 can comprise smoke detection system, photoelectric sensor 400 can placed off to the side of PCB 1302. In an embodiment wherein PCB 1302 can comprise smoke detection systems, photoelectric sensor 400 can be placed off to the side of PCB 1302 while ionization sensor 500 can be placed off to the opposite side of PCB 1302. In one embodiment, PCB 1302 can be mounted within housing 1300 such that upon installation into surface 1301, PCB 1302 is approximately at surface 1301. Further in one embodiment, PCB 1302 can comprise a WIFI antenna 1305. In such embodiment, WIFI antenna 1305 can be printed on PCB 1302. In one embodiment, bottom cover 1303 can extend beyond edges of housing 1301 to form a surface lip 1306. Surface lip 1306 can be capable of interacting with a first side of surface 1301. In one embodiment, bottom cover 1303 can be substantially flush to surface 1301. Bottom cover 1303 can comprise one or more air vents 1307. Each of air vents 1307 can be placed directly underneath each of the smoke detection systems. Thus in an embodiment wherein PCB 1302 can comprise smoke detection systems, photoelectric sensor 400 can be on one side of PCB 1302, and directly underneath photoelectric sensor 400 can be a first air vent 1307a placed off to the side of bottom cover 1303, while ionization sensor 500 can be on the other side of PCB 1302, and directly underneath ionization sensor 500 can be a second air vent 1307b placed off to the side of bottom cover 1303. Such structure can allow air vents 1307 to receive particulates from the surroundings and allow particulates to enter smoke detector systems within housing 1300. In one embodiment, WIFI antenna 1305 can be mounted on a side of bottom cover 1303 such that WIFI antenna 1305 can be below surface 1301. This can ensure that the line-of-sight radio transmissions of WIFI antenna 1305 are not blocked by drywall or ceiling studs. In one embodiment, PCB 1302 can comprise camera 409. In one embodiment, camera 409 can be mounted on an outer surface of bottom cover 1303 to allow camera 409 a maximum field of vision. In another embodiment, the smoke detector for recessed installment can further comprise a PoE connection 1308. In one embodiment, PoE connection 1308 can be on a side of housing 1300. PoE can be connectable to an Ethernet cable.

Further each pair of clips 1304 can be at the opposite side of housing 1300. Clips 1304 can be capable of interacting with a second side of surface 1301 such that together with surface lip 1305, clips 1304 can mount housing 1300 within surface 1301. In one embodiment, clips 1304 can comprise a spring that can allow clips 1304 be depressed or expanded at the sides of housing 1300. In such embodiment, when housing 1300 is pushed and embedded into surface 1301, clips 1304 can be depressed towards the side of housing 1300 allowing housing 1300 to slide within surface 1301. Once clips 1304 can be above the second side of surface 1301, the spring on clips 1304 can allow clips 1304 to expand outwards thus, securing housing 1300 in place. Clips 1304 can ensure that smoke detector 200 can not only be stud or joist mounted but can also be installed after drywall is already in place.

Figure 14:
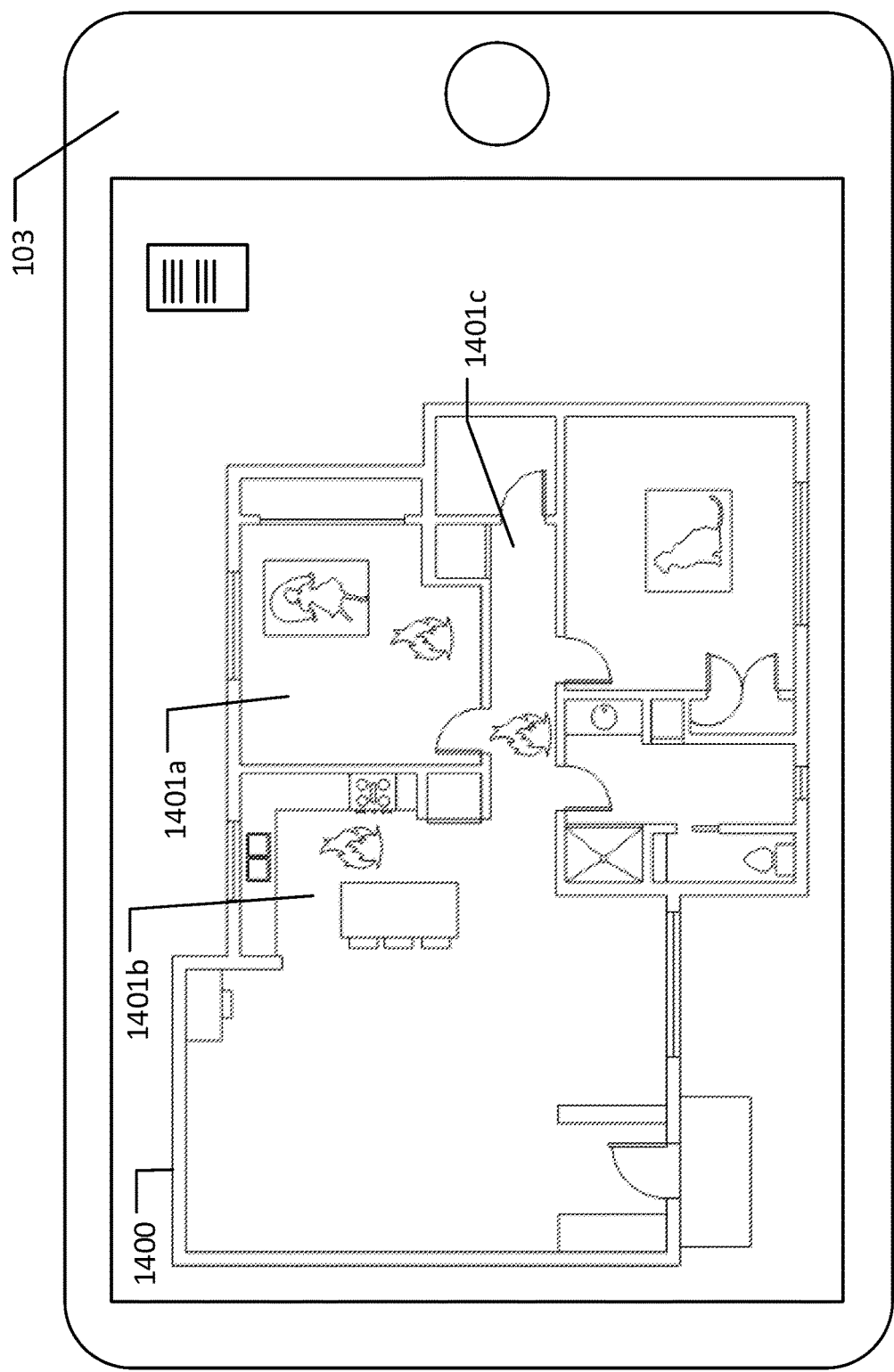
FIG. 14 illustrates a mobile device operable to interact with a smart device over a network.

FIG. 14 illustrates a mobile device interacting with smart devices over a network. In an event that there is fire in a location, smoke detector application 304 can allow mobile devices 103 to display a floor plan 1400 of the vicinity. In one embodiment, once smoke is detected, smoke detectors 200 can use camera 409 to continuously take images and/or videos of the area wherein the smoke detectors are installed. Concurrently, images or videos taken can be sent by smoke detectors 200 to home monitoring server 101 and/or emergency response servers 102. This can allow the servers to store the data in real-time and to ensure data can be retrieve in case smoke detectors 200 get burned during the fire.

Further as an example embodiment, floor plan 1400 can have a plurality of areas 1401. In this embodiment, first smoke detector 200a can be installed on a first-floor master bedroom area 1401a, second smoke detector 200b can be installed on a kitchen area 1401b, and third smoke detector 200c can be installed on a hallway area 1401c. In one embodiment, each smoke detector 200 can be associated with an area profile (stored within server data storage 305). In one embodiment, the area profile can comprise of information entered by the user regarding the details of an area, which can include type of flammable material within the area, such as carpets and curtains, location of sprinklers, and the structural material used on the area such as wooden partition, wooden ceilings, etc. In another embodiment, the area profile can comprise of information that can be captured during the actual fire situation using camera 409, and sensors on each smoke detector 200. In such embodiment, information can include living beings such as animals or persons within the area, burning material within the area, and time that area 1401 has detected smoke or caught fire. In one embodiment, by accessing smoke detector application 304, users and responders can use mobile devices 103 to view and assess the fire situation within the vicinity. By looking at floor plan 1401 and seeing the span of time fire was detected in each area 1401, users can determine that the fire could have started on kitchen area 1401b since the area can already be detecting smoke for 22 minutes, then several minutes later fire could have spread through the wall of master bedroom area 1401a as smoke detector 200 in that area can be detecting smoke for 5 minutes, and then the fire can probably develop on hallway area 1401c around 2 minutes after master bedroom area 1401a can be caught on fire. Base from area profile captured through camera 409 and shown in floor plan 1400, it can be determined how the fire can spread through the vicinity. Smoke detector 200 could have captured a picture of a burning wood within kitchen area 1401b then the fire could have spread through master bedroom area 1401a because of proximity. And since first smoke detector 1401a can be detecting "polyurethane" particles within the area for around 5 minutes and since the wall of master bedroom 1401a can be near kitchen area 1401b, it can indicate that the fire could have come through the wall that separates the area. Furthermore, the "polyurethane" detected by first smoke detector 1401a in master bedroom 1401a can suggest that carpeting or bedding can be on fire. Since third smoke detector 1401c can also be detecting "polyurethane" from hallway area 1401c it can also indicate that carpet on the hallway can be on fire. Base from floor plan 1400 shown in smoke detector application 304, users can plan an escape route while in the case of responders, the responders can find the best way to access each area 1401.

In another embodiment, smoke detector 200 can be capable of detecting living beings within the vicinity. In such embodiment, camera 409 can be an infrared or thermal camera that can be capable of detecting infrared energy and converts it into an electronic signal. The electronic signal can then be processed, which can produce thermal image. Such feature can allow smoke detector 200 to detect the presence of humans by detecting body heat. In a preferred embodiment, smoke detector application 304 can prioritize showing critical items such as areas that can be occupied by living beings and a burn time information for each area. In one embodiment, smoke detector application 304 can show superimposed graphics to show location of an occupant, and to show trouble spots (or dangerous and critical areas).

Server memory 302 and smoke detector memory 407 is defined herein as including both volatile and nonvolatile memory and data storage components. Volatile components are those that do not retain data values upon loss of power. Nonvolatile components are those that retain data upon a loss of power. Thus, server memory 302 and smoke detector memory 407 can comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM can comprise, for example, static random access memory (SRAM), dynamic random access memory (DRAM), or magnetic random access memory (MRAM) and other such devices. The ROM can comprise, for example, a programmable read-only memory (PROM), an erasable programmable read-only memory (EPROM), an electrically erasable programmable read-only memory (EEPROM), or other like memory device.

Also, server processor 301 and microprocessor 406 can represent multiple server processor 301 and microprocessor 406, while server memory 302 and smoke detector memory 407 can represent multiple server memory 302 and smoke detector memory 407 that operate in parallel processing circuits, respectively. In such a case, first local interface 303 can be an appropriate network, including network 105 that facilitates communication between any two of the multiple server processor 301 and microprocessor 406, between any server processors 301 and microprocessors 406 and any of the server memories 302 and smoke detector memories 407, or between any two of the server memories 302 and smoke detector memories 407, etc. First local interface 303 can comprise additional systems designed to coordinate this communication, including, for example, performing load balancing. Server processors 301 and microprocessors 406 can be of electrical or of some other available construction.

Although smoke detector application 304, and other various systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIG. 7A, FIG. 7B, FIG. 7C, FIG. 9, and FIG. 12 show the functionality and operation of an implementation of portions of smoke detector application 304. If embodied in software, each block can represent a module, segment, or portion of code that comprises program instructions to implement the specified logical function(s). The program instructions can be embodied in the form of source code that comprises human-readable statements written in a programming language or machine code that comprises numerical instructions recognizable by a suitable execution system such as smart box processors 201 and server processors 301 in a computer system or other system. The machine code can be converted from the source code, etc. If embodied in hardware, each block can represent a circuit or a number of interconnected circuits to implement the specified logical function(s).

Although the flowcharts of FIG. 7A, FIG. 7B, FIG. 7C, FIG. 9, and FIG. 12 show a specific order of execution, it is understood that the order of execution can differ from that which is depicted. For example, the order of execution of two or more blocks can be scrambled relative to the order shown. Also, two or more blocks shown in succession in FIG. 7A, FIG. 7B, FIG. 7C, FIG. 9, and FIG. 12 can be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including smoke detector application 304, that comprises software or code can be embodied in any computer-readable storage medium for use by or in connection with an instruction execution system such as, for example, server processors 301 and microprocessors 406 in a computer system or other system. In this sense, the logic can comprise, for example, statements including instructions and declarations that can be fetched from the computer-readable storage medium and executed by the instruction execution system.

In the context of the present disclosure, a "computer-readable storage medium" can be any medium that can contain, store, or maintain the logic or application described herein for use by or in connection with the instruction execution system. The computer-readable storage medium can comprise any one of many physical media such as, for example, electronic, magnetic, optical, electromagnetic, infrared, or semiconductor media. More specific examples of a suitable computer-readable storage medium would include, but are not limited to, magnetic tapes, magnetic floppy diskettes, magnetic hard drives, memory cards, solid-state drives, USB flash drives, or optical discs. Also, the computer-readable storage medium can be a random access memory (RAM) including, for example, static random access memory (SRAM) and dynamic random access memory (DRAM), or magnetic random access memory (MRAM). In addition, the computer-readable storage medium can be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications can be made to the above-described embodiment(s) without departing substantially from the spirit and principles of the disclosure. All such modifications and variations are intended to be included herein within the scope of this disclosure and protected by the following claims.

Various changes in the details of the illustrated operational methods are possible without departing from the scope of the following claims. Some embodiments may combine the activities described herein as being separate steps. Similarly, one or more of the described steps may be omitted, depending upon the specific operational environment the method is being implemented in. It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A smoke detector comprising:
   a photoelectric sensor comprising:
      a low-frequency light source,
      a high-frequency light source, and
      a light sensor;
   a smoke detector memory comprising:
      a smoke detector application,
      a plurality of low-frequency smoke signatures, wherein each of said low-frequency smoke signatures relates to how a low-frequency light interacts with one of a plurality of particulates,
      a plurality of high-frequency smoke signatures, wherein each of said high-frequency smoke signatures relates to how a high-frequency light interacts with one of a said plurality of particulates, each of said particulates indicative or non-indicative of a fire;
   a microprocessor that, according to instructions from said smoke detector application:
      receives light data from said light sensor,
      extracts low-frequency light data and high-frequency light data from said light data,
      compares said low-frequency light data to said plurality of low-frequency smoke signatures to determine if said low-frequency light data matches any of said plurality of low-frequency smoke signatures,
      compares said high-frequency light data to said plurality of high-frequency smoke signatures to determine if said high-frequency light data matches any of said plurality of high-frequency smoke signatures; and
      initiates an alarm sequence if
         said low-frequency light data matches a low-frequency smoke signature related to a fire-indicative particulate of said plurality of particulates, and
         said high-frequency light data matches a high-frequency smoke signature related to said fire-indicative particulate;
   wherein each of said low-frequency smoke signatures comprises stored low-frequency power-transfer-ratio (PTR) data, and each of said high-frequency smoke signatures comprises stored high-frequency PTR data.

2. The smoke detector of claim 1 wherein said low-frequency light is red light.

3. The smoke detector of claim 1 wherein said low-frequency light is infrared light.

4. The smoke detector of claim 1 wherein said high-frequency light is blue light.

5. The smoke detector of claim 1 wherein comparing said low-frequency light data to said low-frequency smoke signatures comprises curve matching said low-frequency light data to said stored low-frequency PTR data.

6. The smoke detector of claim 1 wherein comparing said high-frequency light data to said high-frequency smoke signatures comprises curve matching said high-frequency light data to said stored high-frequency PTR data.

7. The smoke detector of claim 1 wherein comparing said low-frequency light data to said low-frequency smoke signatures comprises determining whether said low-frequency light data reaches a predetermined PTR threshold.

8. The smoke detector of claim 1 wherein comparing said high-frequency light data to said high-frequency smoke signatures comprises determining whether said high-frequency light data reaches a predetermined PTR threshold.

9. The smoke detector of claim 1 wherein said alarm sequence comprises sounding an audible alarm.

10. The smoke detector of claim 1 wherein said alarm sequence comprises turning on a camera.

11. The smoke detector of claim 1 wherein said alarm sequence comprises sending smoke detector data over a network to a server.

12. The smoke detector of claim 11 wherein said smoke detector data comprises said light data.

13. The smoke detector of claim 11 wherein said smoke detector data comprises a cause of said fire based on said light data.

14. A method for detecting smoke using a photoelectric sensor comprising:
   storing in memory:
      a plurality of low-frequency smoke signatures, wherein each of said low-frequency smoke signatures relates to how a low-frequency light interacts with one of a plurality of particulates, and
      a plurality of high-frequency smoke signatures, wherein each of said high-frequency smoke signatures relates to how a high-frequency light interacts with one of said plurality of particulates, each of said particulates indicative or non-indicative of a fire;
   receiving light data from a light sensor;
   extracting low-frequency light data and high-frequency light data from said light data;
   comparing said low-frequency light data to said plurality of low-frequency smoke signatures to determine if said low-frequency light data matches any of said plurality of low-frequency smoke signatures;
   comparing said high-frequency light data to said plurality of high-frequency smoke signatures to determine if said high-frequency light data matches any of said plurality of high-frequency smoke signatures; and
   initiating an alarm sequence if
      said low-frequency light data matches a low-frequency smoke signature related to a fire-indicative particulate of said plurality of particulates, and said high-frequency light data matches a high-frequency smoke signature related to said fire-indicative particulate;
wherein each of said low-frequency smoke signatures comprises stored low-frequency power-transfer-ratio (PTR) data, and each of said high-frequency smoke signatures comprises stored high-frequency PTR data.

15. The method of claim 14 wherein comparing said low-frequency light data to said low-frequency smoke signatures comprises curve matching said low-frequency light data to said stored low-frequency PTR data.

16. The method of claim 15 wherein comparing said high-frequency light data to said high-frequency smoke signatures comprises curve matching said high-frequency light data to said stored high-frequency PTR data.

17. The method of claim 14 wherein comparing said low-frequency light data to said low-frequency smoke signatures comprises determining whether said low-frequency light data reaches a predetermined PTR threshold.

18. The method of claim 14 wherein comparing said high-frequency light data to said high-frequency smoke signatures comprises determining whether said high-frequency light data reaches a predetermined PTR threshold.

19. The method of claim 14 wherein said low-frequency light is red light.

20. The method of claim 14 wherein said low-frequency light is infrared light.

21. The method of claim 14 wherein said high-frequency light is blue light.

22. The method of claim 14 wherein said alarm sequence comprises sounding an audible alarm.

23. The method of claim 14 wherein said alarm sequence comprises turning on a camera.

24. The method of claim 14 wherein said alarm sequence comprises sending smoke detector data over a network to a server.

25. The method of claim 24 wherein said smoke detector data comprises said light data.

26. The method of claim 24 wherein said smoke detector data comprises a cause of said fire based on said light data.

* * * * *